United States Patent
Ono

(10) Patent No.: US 6,667,977 B1
(45) Date of Patent: Dec. 23, 2003

(54) ATM CELL MULTIPLEXING APPARATUS AND METHOD

(75) Inventor: Yoshihisa Ono, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/433,979

(22) Filed: Nov. 4, 1999

(30) Foreign Application Priority Data

Mar. 18, 1999 (JP) .......................................... 11-073211

(51) Int. Cl.$^7$ .............................................. H04L 12/28
(52) U.S. Cl. ..................... 370/392; 370/395.1; 370/422; 370/428; 370/461; 370/463; 370/474; 370/535; 370/536; 370/537
(58) Field of Search ................................ 370/352, 389, 370/392, 422, 428, 474, 395, 535, 536, 537, 359, 461, 463

(56) References Cited

U.S. PATENT DOCUMENTS

| | | | | | |
|---|---|---|---|---|---|
| 5,737,312 | A | * | 4/1998 | Sasagawa | .................... 370/232 |
| 6,021,135 | A | * | 2/2000 | Ishihara et al. | .............. 370/474 |
| 6,052,375 | A | * | 4/2000 | Bass et al. | ................... 370/412 |
| 6,226,264 | B1 | * | 5/2001 | Shihata et al. | ............... 370/232 |
| 6,324,176 | B1 | * | 11/2001 | Bodnar et al. | ............... 370/376 |

FOREIGN PATENT DOCUMENTS

JP          8-149139          6/1996

* cited by examiner

Primary Examiner—Alpus H. Hsu
Assistant Examiner—Roberta Stevens
(74) Attorney, Agent, or Firm—Katten Muchin Zavis Rosenman

(57) ABSTRACT

In an ATM cell multiplexing apparatus for assembling data, which arrives from multiple terminal lines, into cells, time-division multiplexing the cells and transmitting them to a network, traffic management is performed in each cell assembler, based upon service category and traffic, for every channel accommodated by the terminal lines, and traffic management on a per-cell-assembler basis is performed in an ATM bus scheduler taking into consideration service categories and traffic of all channels accommodated by the cell assemblers. Further, the ATM bus scheduler creates a main schedule table and a subschedule table, which is referred to after the main schedule table, for allocating more transmission privileges to a cell assembler that accommodates a CBR channel, and grants transmission privileges to the cell assemblers upon referring to the main schedule table and subschedule table.

14 Claims, 18 Drawing Sheets

FIG. 13A
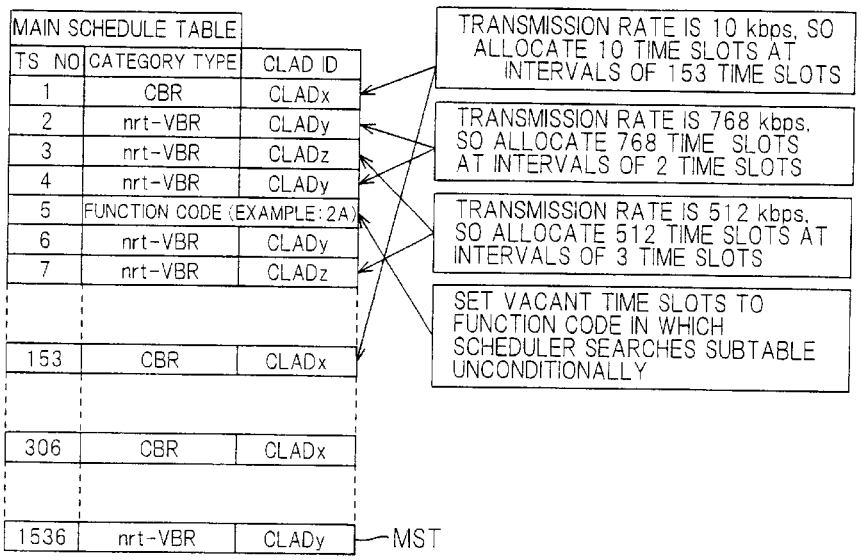
FIG. 13B
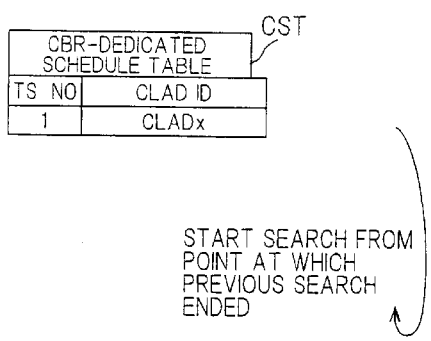
FIG. 13C
| FIRST SUBSCHEDULE TABLE | | SST1 |
|---|---|---|
| TS NO | CLAD ID | |
| 1 | CLADy | |
| 2 | CLADz | |
| 3 | CLADy | |
| 4 | CLADz | |
| 5 | CLADy | |
| 6 | CLADz | |
| 7 | CLADy | |
START SEARCH FROM POINT AT WHICH PREVIOUS SEARCH ENDED
FIG. 13D
| SECOND SUBSCHEDULE TABLE | | SST2 |
|---|---|---|
| TS NO | CLAD ID | |
| 1 | CLADz | |

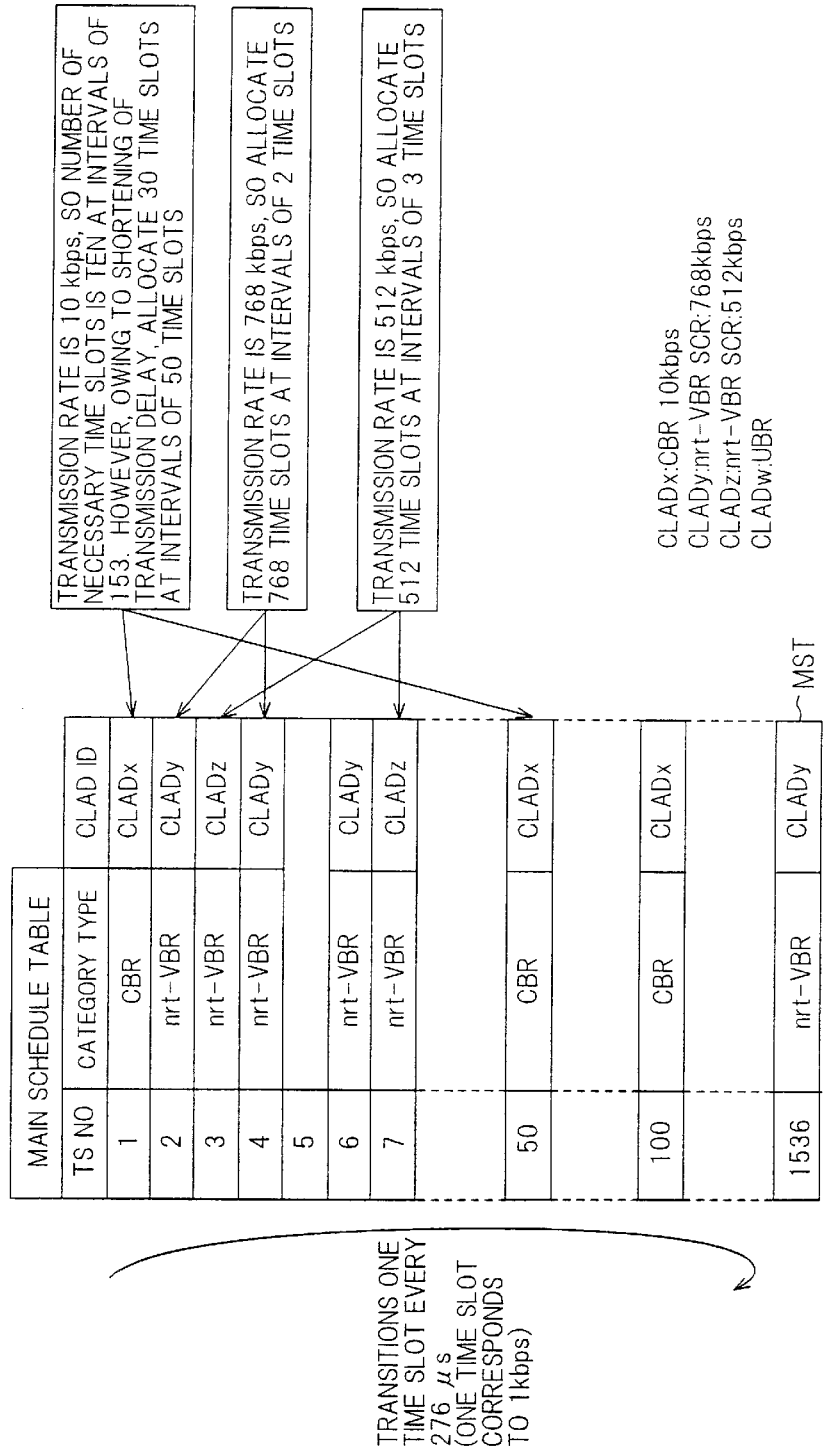

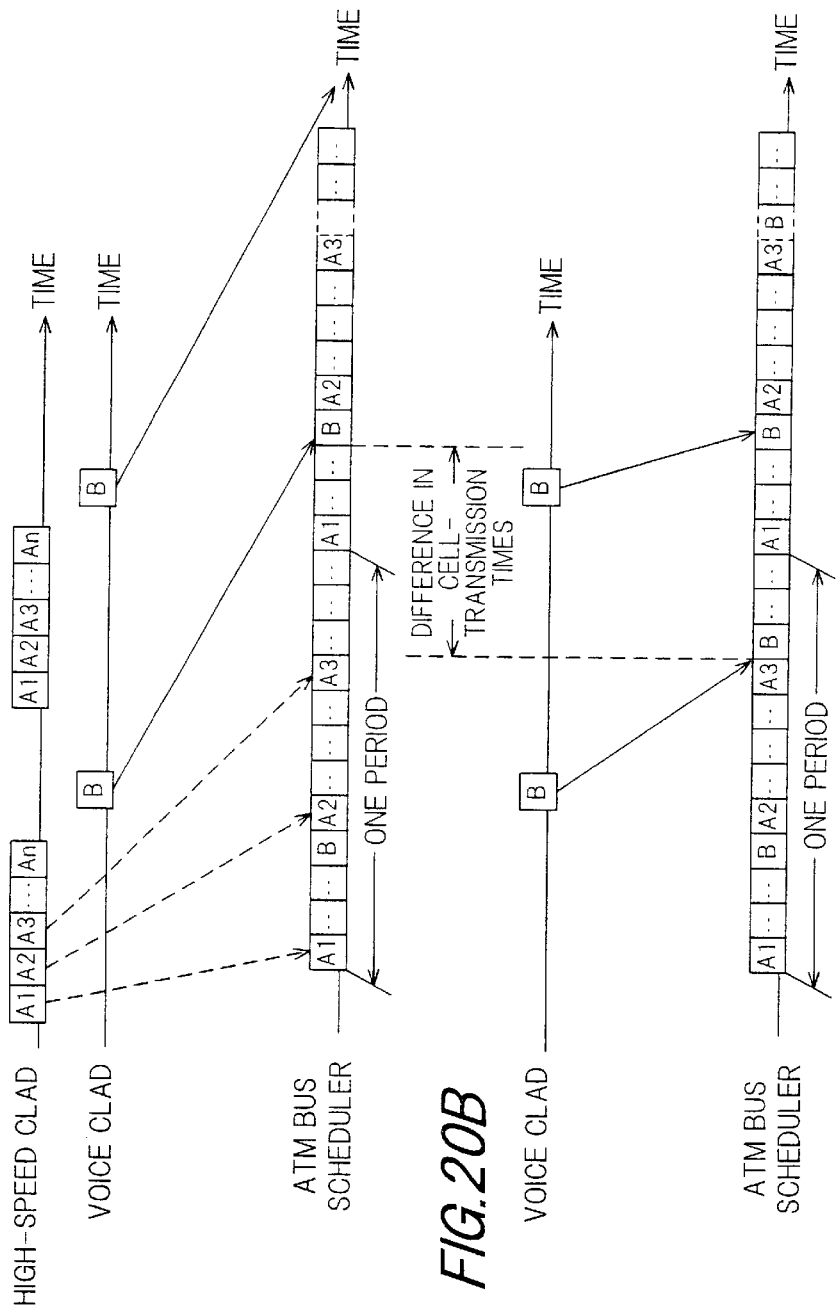

ATM CELL MULTIPLEXING APPARATUS AND METHOD

BACKGROUND OF THE INVENTION

This invention relates to an ATM cell multiplexing apparatus and method. More particularly, the invention relates to an ATM cell multiplexing apparatus, which is provided between a terminal and an ATM switch, for assembling data input from multiple terminal lines into ATM cells, time-division multiplexing the ATM cells and transmitting them to an ATM network, and to method of multiplexing ATM cells.

ATM (Asynchronous Transfer Mode) is expected to be a viable technique for realizing multimedia communications and ATM schemes intended for communication of high-speed data especially between computers are being developed. In addition, networks for interworking of existing communications protocols such as voice, HDLC and FR (frame relay) protocols in ATM are being sought in the market, as evidenced by recent ATM Forums. Constructing such a network entails constructing ATM switches as a backbone network. In addition, in order to raise the efficiency of terminal-line accommodation, an ATM cell multiplexer is placed as an intermediate apparatus between an ATM switch and a terminal.

(a) General Placement of ATM Cell Multiplexers

FIG. 14 is an explanatory view illustrating the general placement of ATM cell multiplexers. ATM cell multiplexers $2_1$–$2_n$ on the transmitting side assemble data, which has been received from terminals $1_1$–$1_m$, into cells and send the cells to an ATM network 3 (composed of ATM switches 3a, 3b) via trunk lines 4. ATM cell multiplexers $6_1$–$6_n$ on the receiving side disassemble the ATM cells, which have been received from the ATM network 3 via a trunk line 5, and send the resulting data to terminals $7_1$–$7_m$. The ATM cell multiplexers $2_1$–$2_n$, $6_1$–$6_n$ are capable also of transmitting data in similar fashion in a direction opposite that set forth above.

Exacting traffic control (control of Quality of Service, or QOS) specific to ATM protocols is required with ATM cell multiplexers of the kind mentioned above. Conventional ATM cell multiplexers come equipped with ATM switches in order to carry out such traffic control. However, a drawback with such an arrangement is that ATM switches involve high manufacturing cost. Another shortcoming is complicated software and hardware control and an apparatus that is large in size. For these reasons, an ATM cell multiplexer that does not employ an ATM switch is in demand. However, with schemes that simply multiplex cells, it is necessary to delay cells to avoid collision when cells in a plurality of connections come into contention. Owing to such delay, a simple cell multiplexing scheme cannot be applied when multiplexing and transmitting media that has little tolerance for delay, such as low-speed CBR (Constant Bit Rate) media.

In view of the foregoing, an ATM cell multiplexing apparatus requires a method of multiplexing, efficiently and simply, cells transmitted from multiple CLAD (Cell Assembly and Disassembly) units which assemble data received from terminals into cells and disassemble cells received from trunk lines. To accomplish this, there has been proposed a distributed-CLAD ATM cell multiplexing apparatus by which cells, which are transmitted from multiple internal CLAD units, are statistically multiplexed and transmitted on an ATM bus efficiently and simply.

(b) Proposed ATM Cell Multiplexing Apparatus

FIG. 15 is a block diagram illustrating the proposed ATM cell multiplexing apparatus mentioned above. The apparatus includes an ATM bus scheduler 11, an ATM bus 12 for sending ATM cells, a plurality of CLADs (cell assembler/disassemblers) $13_0$–$13_5$, a trunk line controller 14 and a backup line controller 15 for backing up the trunk line controller.

The cell assembler/disassemblers $13_0$–$13_5$, which are connected to the ATM bus 12 in parallel, assemble data input from corresponding terminal lines $16_0$–$16_5$ into ATM cells and send the cells to the ATM bus 12. Further, the cell assembler/disassemblers $13_0$–$13_5$ accept ATM cells from a network via the ATM bus 12, disassemble the cells and send the resulting data to the corresponding terminal lines. A prescribed service category (CBR, rt-VBR, nrt-VBR, UBR) and an amount of traffic (peak cell rate, sustained cell rate) are provided for each terminal line in advance. The ATM cell multiplexing apparatus performs traffic management conforming to the service category and amount of traffic for every cell assembler/disassembler $13_0$–$13_5$. CBR (Constant Bit Rate) is a constant-speed bit rate service, rt-VBR (real-time Variable Bit Rate) is a real-time variable bit rate service, nrt-VBR (not real-time Variable Bit Rate) is a variable bit rate service that is not real-time, and UBR (Unspecific Bit Rate) is a random bit rate service. The CBR service is set for the terminal line $16_0$, the rt-VBR service for the terminal line $16_1$, the UBR service for the terminal lines $16_2$, $16_5$, and the nrt-VBR service for the terminal lines $16_3$, $16_4$.

The ATM bus scheduler 11, which is for providing the cell assembler/disassemblers $13_0$–$13_5$ an opportunity to transmit cells, controls the sending and receiving of cells performed via the ATM bus 12. For example, the ATM bus scheduler 11 provides the privilege to transmit to cell assembler/disassemblers allocated to respective ones of N-number of cyclically repeating time slots. A cell assembler/disassembler that has been given the privilege to transmit is thus allowed to send cells to the ATM bus. The trunk line controller 14 time-division multiplexes ATM cells sent to the ATM bus 12 from the cell assembler/disassemblers and transmits these cells to the network via a trunk line $17_1$. In addition, the trunk line controller 14 sends the ATM bus 12 ATM cells from the network. By virtue of this arrangement, the ATM cell multiplexing apparatus implements cell multiplexing and traffic control without being equipped with an ATM switch.

Basically, the ATM bus scheduler 11 controls the ATM bus 12 in the following manner:

(1) In a situation where the plurality of existing cell assembler/disassemblers $13_0$–$13_5$ transmit cells to the ATM bus 12, the ATM bus scheduler 11 performs control so as to avoid contention among transmitted cells on the ATM bus 12.

(2) The cell assembler/disassemblers $13_0$–$13_5$ transmit cells to an ATM switch in accordance with the service categories (CBR, rt-VBR, nrt-VBR, UBR) stipulated by the ATM Forum. The ATM bus scheduler 11, therefore, grants the cell assembler/disassemblers the privilege to transmit based upon the service categories. A cell assembler/disassembler among the cell assembler/disassemblers $13_0$–$13_5$ may transmit cells to the ATM bus 12 only if it has been granted the transmission privilege by the ATM bus scheduler 11.

(3) In a case where the cell assembler/disassemblers $13_0$–$13_5$ transmit cells, the ATM bus scheduler 11 controls cell transmission in conformity with traffic in such a manner that the transmission rate will not exceed a pre-established peak cell rate (PCR) and sustained cell rate (SCR).

(c) Schedule Table

In order to realize (1) to (3) above, the ATM bus scheduler 11 has three schedule tables, namely a main schedule table MST, a first subschedule table SST1 for nrt-VBR and a second subschedule table SST2 for UBR, as shown in FIG. 16, and performs traffic management, in accordance with the service category and traffic, based upon these tables.

The main schedule table MST establishes the transmission privilege with regard to the cell assembler/disassemblers $13_0$, $13_1$, $13_3$, $13_4$ (FIG. 15) for the CBR service, rt-VBR service and nrt-VBR service and sets which cell assembler/disassembler is to be granted the transmission privilege in each of the N-number of cyclically repeating time slots $TS_1$ to $TS_N$. The setting of the transmission privilege is performed when a cell assembler/disassembler or trunk line is registered or changed. The transmission privilege is set taking into consideration the service category and traffic (peak cell rate PCR and sustained cell rate SCR) of the channel which the cell assembler/disassembler accommodates. For example, transmission privileges of a number conforming to the percentage of the sustained cell rate SCR are granted to the cell assembler/disassemblers and the transmission privileges are set in the time slots $TS_1$–$TS_N$ of the main schedule table MST in the following order of priority: CBR service→rt-VBR service→nrt-VBR service. If the setting of transmission privilege allocated to each cell assembler/disassembler is finished, or if there are no longer any vacant time slots in the main schedule table MST, the setting of transmission privilege is completed.

The first subschedule table SST1, which is referred to following the main schedule table MST, establishes the transmission privilege for the cell assembler/disassemblers $13_3$, $13_4$, which accommodate the nrt-VBR channel, in accordance with the percentage of the peak cell rate PCR. When the transmission privilege is granted to a certain cell assembler/disassembler in a time slot for which reference is made to the main schedule table MST, the transmission privilege is granted to a cell assembler/disassembler which accommodates the nrt-VBR channel upon referring to the first subschedule table SST1 if there is no cell to be transmitted to the above-mentioned cell assembler/disassembler, or if the transmission rate is greater than the peak cell rate, or if the transmission privilege has not been granted to any cell assembler/disassembler in this time slot.

The second subschedule table SST2, which is referred to following the first subschedule table SST1 (i.e., last), establishes the transmission privilege in order for the cell assembler/disassemblers $13_2$, $13_5$ of the UBR service. In a case where a cell assembler/disassembler to transmit a cell is not determined even when the main schedule table MST and first subschedule table SST1 are searched, the transmission privilege is granted to a certain cell assembler/disassembler upon referring to the second subschedule table SST2.

(d) Example of Schedule Table Settings

FIGS. 17 and 18 are diagrams useful in describing a specific example of schedule table settings in a proposed ATM bus scheduler. FIG. 17 shows an example of a main schedule table and FIG. 18 an example of a subschedule table. Here CLADx represents a cell assembler/disassembler for accommodating low-speed CBR media, CLADy, CLADz are cell assembler/disassemblers for accommodating nrt-VBR media, and CLADw is a cell assembler/disassembler for accommodating UBR media. The respective parameters are as follows: Trunk line speed of ATM cell multiplexer: 1.536 Mbps

| | | | | | |
|---|---|---|---|---|---|
| CLADx: | CBR 10 kbps | | | | |
| CLADy: | nrt-VBR | SCR: | 768 kbps | PCR: | 1024 kbps |
| CLADz: | nrt-VBR | SCR: | 512 kbps | PCR: | 768 kbps |
| CLADw: | UBR | | | | |

Since the speed of the trunk line is 1.536 Mbps, the transmission interval of one cell is 276 $\mu$s (=53×8/1.536×10$^6$ sec). This interval is adopted as one time slot (TS) on the ATM bus. Since the main schedule table MST is such that 1536 time slots constitute one cycle, one cycle is 53×8/10$^3$ (sec) and the transmission rate of one time slot (53×8 bits) is 1 kbps.

In the setting of the main schedule table MST, the set allocation of transmission privilege with respect to the cell assembler/disassemblers CLADx, CLADy, CLADz is decided in accordance with the sustained cell rate SCR. The sum total 1290 kbps of the SCRs (=10 kbps+768 kbps+512 kbps), therefore, is equally distributed at a percentage with respect to the overall speed (=1536 kbps) of the trunk line. Since the number of time slots of the main schedule table MST is 1536 (1 TS=1 kbps), the number allocated to each of the cell assembler/disassemblers is as follows: 10 for CLADx, 768 for CLADy, 512 for CLADz and 246 for vacant time slots.

As for the order of time-slot allocation to the main schedule table MST, allocation is performed preferentially in the aforesaid order CBR→rt-VBR→nrt-VBR. Accordingly, first ten time slots (see FIG. 17) are allocated to CLADx at equal intervals in such a manner that CLADx will appear every 153 or 154 time slots; then 768 time slots are allocated to CLADy at equal intervals in such a manner that CLADy will appear every 2 or 3 slots; and finally 512 time slots are allocated to CLADz at equal intervals in such a manner that CLADz will appear every 3 slots. Function codes are filled in all of the remaining time slots in such a manner that the ATM bus scheduler will make a transition to and search the subtables unconditionally.

In the setting of the first subschedule table SST1 for nrt-VBR, transmission privileges are distributed equally at the percentage of the PCRs of the cell assembler/disassemblers accommodating the nrt-VBR channel. Accordingly, if the number of time slots of the first subschedule table SST1 is seven, as shown at (1) in FIG. 18, four are allocated to CLADy and three to CLADz (1024:768=4:3).

The setting of the second subschedule table SST2 for UBR is carried out by allocating transmission privileges to the UBR-channel accommodating cell assembler/disassemblers in order. Accordingly, if the number of time slots is one, one CLADw is allocated, as indicated at (2) in FIG. 18.

Thus, as set forth above, the proposed ATM cell multiplexing apparatus performs traffic management based upon the service category and traffic of the channels accommodated by cell assembler/disassemblers. However, the proposed ATM cell multiplexing apparatus has the following two disadvantages:

(1) The units of management of control of the ATM bus scheduler 11 on the ATM bus on which statistical multiplexing is performed are the units of the cell assembler/disassemblers (i.e., in units of the CLADs). As a consequence, the channels of a plurality of service categories (e.g., VBR, UBR) cannot be mixed in a cell assembler/disassembler, and it is necessary that the channel-accommodating cell assembler/disassemblers be classified according to service category. As a result, the hardware and lines on the side of the terminal lines must be increased.

It is required that VBR media, for which average/maximum throughput is guaranteed regardless of traffic, and UBR media, which is capable of using a band if there is no other traffic, be accommodated separately on a per-CLAD basis and on a per-terminal-line basis. These cannot be accommodated by terminal lines for which prescribed service categories have already been established.

Accordingly, lines accommodated by an ATM cell multiplexer must be re-accommodated according to service category and it is required that terminals and lines be increased as necessary. In addition, depending upon the network conditions, there are cases where terminals and lines cannot be grouped by service category; even if the lines are accommodated by ATM cell multiplexer, accurate traffic control will not be possible.

(2) In the case of low-speed CBR media such as low-speed or constant-speed data or voice that is extremely intolerant to delay time, a problem which arises is transmission delay brought about by the fact that there is no synchronization between an opportunity for a cell assembler/disassembler to generate a cell and an opportunity for a scheduler to transmit. However, since it is impossible to predict a correction for the purpose of achieving synchronization, a transmission delay of less than one period of the cell generating interval, which is the maximum theoretical, occurs. Accordingly, a scheme of the kind shown in FIG. 19 has been proposed. Here many transmission opportunities (transmission privileges) in the ATM bus scheduler are permanently granted to low-speed CBR media such as low-speed data or voice that is intolerant to delay time, as a result of which it becomes possible to perform communication with little delay. FIG. 19 is an example in which, in comparison with the normal case, more transmission opportunities (three times as many) are permanently granted to the cell assembler/disassembler CLADx, which accommodates low-speed CBR, in parameters similar to those of FIG. 17, namely Trunk line speed of ATM cell multiplexer: 1.536 Mbps

| CLADx: | CBR 10 kbps | | | | |
|---|---|---|---|---|---|
| CLADy: | nrt-VBR | SCR: | 768 kbps | PCR: | 1024 kbps |
| CLADz: | nrt-VBR | SCR: | 512 kbps | PCR: | 768 kbps |
| CLADw: | UBR | | | | |

Since the sustained transmission rate SCR of the cell assembler/disassembler CLADx is 10 kbps, the number of time slots necessary is ten at intervals of 153 times slots. Owing to the shortening of the transmission delay in FIG. 19, however, the transmission privilege is set for 30 time slots at intervals of 50 time slots.

If this arrangement is adopted, the result is as shown in FIGS. 20A and 20B. Specifically, in comparison with the scheme (FIG. 20A) that does not increase transmission opportunities, the proposed scheme (FIG. 20B) provides a three-fold increase in transmission opportunities and is capable of shortening the delay time of cell transmission (e.g., by one-third). With the proposed scheme, however, bands are wasted owing to the granting of more transmission privileges in permanent fashion. As a consequence, bands are used less efficiently, bands having two to three times the media throughput must be considered when designing the network and the effect of accommodating trunk lines is not good.

Further, the proposed scheme permanently grants two to three times the transmission opportunities with respect to the actual transmission band of a cell assembler/disassembler. However, the band of the ATM scheduler is equal to that of the trunk line. This means the existence of transmission opportunities (time slots) not actually used. The band of the trunk line, therefore, cannot be utilized at 100% efficiency.

SUMMARY OF THE INVENTION

Accordingly, an object of the present invention is to make it possible for a single cell assembler/disassembler to accommodate a plurality of channels (e.g., an nrt-VBR channel and a UBR channel) for which the service categories are different.

Another object of the present invention is to so arrange it that even if each cell assembler/disassembler accommodates a plurality of channels having different service categories, traffic management that takes service category and traffic into account can be performed on a per-channel basis and, moreover, traffic management that takes the service category and traffic of the cell assembler/disassemblers into account can be performed on a per-assembler/disassembler basis.

A further object of the present invention is to shorten the cell delay time of a low-speed CBR service without lowering band utilization efficiency.

(a) First Aspect of the Present Invention

In accordance with a first aspect of the present invention, a cell assembler performs traffic management, which is based upon service category and traffic, for every channel that is accommodated by the cell assembler, and an ATM bus scheduler performs traffic management for every cell assembler.

In this case, if the rate at which data on each channel flows in from a terminal line exceeds a peak rate that has been stipulated for this channel, the cell assembler discards this data.

Further, the cell assembler assigns priorities to service categories, assembles data into cells in order of priority on the basis of the service category of each channel, and sends the cells to an ATM bus whenever a transmission privilege is granted.

Further, an ATM cell scheduler, taking into consideration the service categories and traffic of all channels accommodated by a cell assembler, decides a schedule for granting a transmission privilege to this cell assembler, and performs traffic management for every cell assembler based upon this schedule.

Further, the ATM cell scheduler monitors the cell transmission rate of each cell assembler and, if the cell transmission rate of a cell assembler exceeds a total value of peak cell rates of each of the channels of this cell assembler, grants no transmission privilege to this cell assembler.

If the arrangement described above is adopted, multiple channels having different service categories can be accommodated by a single cell assembler through a simple structure, traffic management that takes service category and traffic into account can be performed on a per-channel basis, and traffic management that takes service category and traffic into account can be performed for every cell assembler.

Further, since a cell assembler/disassembler and a physical line can accommodate channels of a plurality of service categories, multiplexing efficiency is raised greatly and it is possible to scale-down hardware, lower cost and reduce the number of terminal accommodation lines.

(b) Second Aspect of the Invention

In accordance with a second aspect of the present invention, an ATM cell scheduler (1) creates a main schedule table, which applies a transmission privilege in each of N-number of time slots to a prescribed cell assembler, based upon service categories and traffic of all channels accommodated by a cell assembler; (2) creates a subschedule table, which is referred to after the main schedule table, for allocating more transmission privileges to cell assemblers that accommodate a low-speed CBR channel; and (3) and grants transmission privilege to cell assemblers upon referring to the main schedule table and subschedule table.

For example, on the basis of a cell rate obtained by totaling sustained cell rates of each of the channels accommodated by a cell assembler, the ATM cell scheduler creates a main schedule table in such a manner that a transmission privileges in each of the N-number of time slots are granted to each of the cell assemblers. Further, in order to allocate more transmission privileges to cell assemblers that accommodate a low-speed CBR channel, the ATM cell scheduler provides first subschedule table and allocates the transmission privileges solely to cell assemblers that accommodate the low-speed CBR channel, this allocation being made in the first subschedule table referred to after the main schedule table. The ATM cell scheduler grants transmission privileges to cell assemblers upon referring to these schedules.

In this case the ATM cell scheduler grants transmission privileges to cell assemblers upon referring to the subschedule tables if a cell to be transmitted to cell assembler to which the transmission privilege has been granted does not exist in a certain time slot, or if the cell transmission rate is greater than the peak cell rate in this cell assembler, or if the transmission privilege has not been granted to a cell assembler in this time slot.

If the arrangement described above is adopted, waiting time on an ATM multiplexing bus is shortened for media, namely low-speed CBR media such as low-speed data and voice, that involves strict delay-time requirements and for which transmission in real-time must be guaranteed. This makes possible communication with little delay and also makes it possible to support networks having multiple repeaters.

Further, whereas the prior art requires that CBR media be allocated a band that exceeds the necessary band, the present invention is such that merely setting the necessary band assures little delay and makes it possible to raise band utilization efficiency.

Other features and advantages of the present invention will be apparent from the following description taken in conjunction with the accompanying drawings.

BRIEF DESCRIPTION OF THE DRAWINGS

FIGS. 13A, 13B, 13C and 13D are examples of settings in other schedule tables for realizing little delay with respect to low-speed CBR media;

FIG. 19 is a diagram useful in describing a proposed schedule table for achieving little delay with respect to low-speed CBR media; and FIGS. 20A, 20B are diagrams useful in describing improvements in transmission delay of low-speed CBR media.

DESCRIPTION OF THE PREFERRED EMBODIMENTS (A) ATM Cell Multiplexing Apparatus

Figure 1:
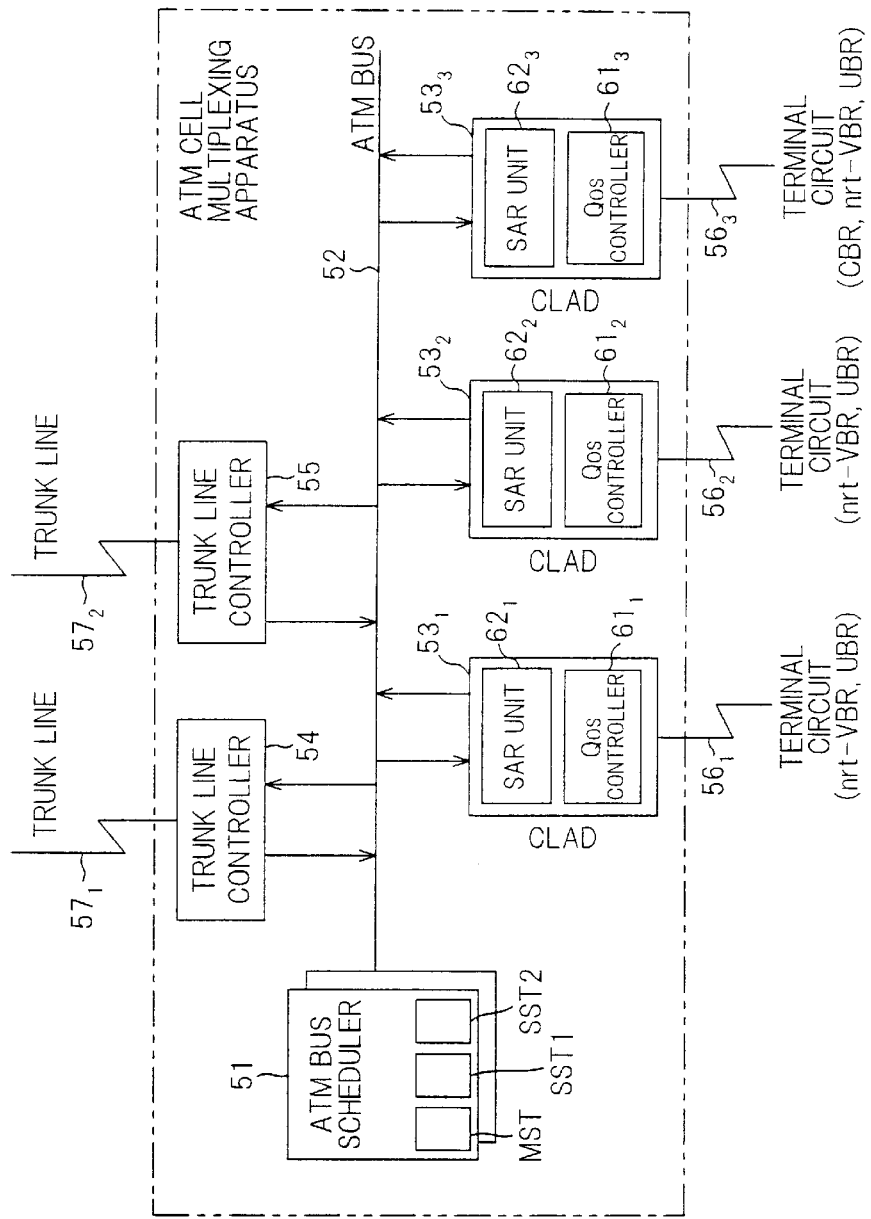
FIG. 1 is a block diagram of an ATM cell multiplexing apparatus according to the present invention.

FIG. 1 is a block diagram of an ATM cell multiplexing apparatus according to the present invention. The apparatus includes an ATM bus scheduler 51, an ATM bus 52 for transmitting ATM cells, a plurality of CLADs (cell assembler/disassemblers) $53_1$–$53_3$, a trunk line controller 54, and a backup line controller 55 for backing up the trunk line controller. It should be noted that the number of cell assembler/disassemblers is not limited to three.

The cell assembler/disassemblers $53_1$–$53_3$, which are connected to the ATM bus 52 in parallel, assemble data input from corresponding terminal lines $56_1$–$56_3$ into ATM cells and send the cells to the ATM bus 52. Further, the cell assembler/disassemblers $53_1$–$53_3$ accept ATM cells from a network via the ATM bus 52, disassemble the cells and send the resulting data to the corresponding terminal lines.

The assembler/disassemblers $53_1$–$53_3$ accommodate multiple channels having different service categories (CBR, rt-VBR, nrt-VBR, UBR) and are capable of executing predetermined processing. For example, each cell assembler/disassembler performs traffic management, on a per-channel basis, based upon the service category and traffic of the channel. Data communication is carried out upon multiplexing a plurality of channels of different service categories on each of the terminal lines. In FIG. 1, data communication is carried out by multiplexing channels for nrt-VBR and UBR services on terminal lines $56_1$, $56_2$ and channels for CBR, nrt-VBR and UBR services on terminal line $56_3$.

The cell assembler/disassemblers $53_1$–$53_3$ respectively include traffic management units (QOS controllers) $61_1$–$61_3$ for performing traffic monitoring and control, which is based upon service category and traffic, for each channel accommodated by the corresponding terminal lines $56_1$–$56_3$, and cell assembling and disassembling units (SAR units) $62_1$–$62_3$ for assembling data into cells, sending the cells to the ATM bus 52 whenever transmission privilege is granted by the ATM bus scheduler, accepting self-addressed ATM cells from the ATM bus and disassembling these ATM cells.

The ATM bus scheduler 51, which is for granting the cell transmission privilege to the cell assembler/disassemblers $53_1$–$53_3$, performs traffic management, which is commensurate with the service category and traffic, for each of the cell assembler/disassemblers $53_1$–$53_3$. For example, the ATM bus scheduler 51 grants the transmission privilege to cell assembler/disassemblers that have been allocated to each of N-number of cyclically repeating time slots, and a cell assembler/disassembler that has been granted the transmission privilege is allowed to send cells to the ATM bus. The trunk line controller 54 time-division multiplexes ATM cells sent to the ATM bus 52 from the cell assembler/ disassemblers and transmits these cells to the network via a trunk line $57_1$. In addition, the trunk line controller 54 sends the ATM bus 52 the ATM cells from the network. If the trunk line controller 54 or trunk line $57_1$ malfunctions, the backup line controller 55 acts in place of the trunk line controller 54 to implement the sending and receiving of cells between the network and ATM cell multiplexing apparatus.

(B) Overview of Traffic Management According to the Invention

According to the present invention, traffic management is executed in distributed fashion in order that a cell assembler/ disassembler may accommodate lines having mixed channels for which the services categories are different. That is, (i) the cell assembler/disassemblers $53_1$–$53_3$ perform traffic management based upon service category and traffic for every channel accommodated by a terminal line, and (ii) the ATM bus scheduler 51 performs traffic management, for each cell assembler/disassembler, based upon service category and traffic of each channel accommodated by the cell assembler/disassembler.

More specifically, the QOS controllers $61_1$–$61_3$ of the cell assembler/disassemblers $53_1$–$53_3$ perform traffic management on per-channel basis in accordance with (1) to (4) below.

(1) The traffic flow rate of frames received from a line is measured by service category (by channel).

(2) With regard to a VBR service category, frames are assembled into cells and transmitted in such a manner that a reported value [peak cell rate (PCR)] that has been decided for each channel will not be exceeded, and control is performed in such a manner that the transmission cell rate will not fall below the PCR.

(3) In a case where a frame that exceeds the reported value [peak cell rate (PCR)] flows in channel by channel, the frames are stored in a buffer up to a fixed quantity and are discarded in frame units when a threshold value is exceeded.

(4) UBR frames are assembled into cells and transmitted only in a case where inflow of VBR frames in the same cell assembler/disassembler is zero in regard to a UBR service category. If there is no cell transmission opportunity, the frames are stored in a buffer up to a fixed quantity and are discarded in frame units when a threshold value is exceeded.

Further, the ATM bus scheduler 51 performs traffic management for each cell assembler/disassembler in accordance with (1) to (3) below.

(1) In a case where cells are transmitted to the ATM bus 52 from the plurality of existing cell assembler/disassemblers $53_1$–$53_3$, contention among cells transmitted on the ATM bus 52 is avoided.

(2) In order to avoid such cell contention, a schedule is set up and each cell assembler/disassembler is granted a cell transmission privilege in accordance with this schedule. That is, the ATM bus scheduler 51 sets up the schedule based upon service category and traffic of each channel accommodated by every cell assembler/disassembler and grants cell transmission privileges to each of the cell assembler/ disassemblers in accordance with this schedule. A cell assembler/disassembler that has been granted the transmission privilege transmits a cell to the ATM bus 52.

(3) Taking into consideration the service category and traffic of each channel accommodated by a cell assembler/ disassembler, the ATM bus scheduler decides the peak cell rate (PCR) of this cell assembler/disassembler. In a case where the cell assembler/disassemblers $53_1$–$53_3$ transmit cells, control of cell transmission commensurate with traffic is carried out in such manner that the actual transmission rate will not exceed the peak cell rate (PCR).

The setting of transmission privileges in schedule tables is performed as follows:

(1) Even if cell assembler/disassemblers accommodate a plurality of channels for which the service categories are different, transmission privileges are granted on a per-cell-assembler/disassembler basis.

(2) For channels of the CBR category, the constant speed of the CBR is totaled for each cell assembler/disassembler, and for channels of the VBR category, the sustained cell rate (SCR) of the VBR is totaled for each cell assembler/ disassembler. Transmission privileges are allocated to the cell assembler/disassemblers at percentages that are proportional to the total values. That is, CLAD IDs are written to time slots TS1–TSN of the main schedule table MST in such a manner that transmission privileges will be allocated to cell assembler/disassemblers at percentages proportional to the total values.

(3) For channels of the nrt-VBR category, the peak cell rate (PCR) of nrt-VBR is totaled for each cell assembler/ disassembler and transmission privileges are allocated to the cell assembler/disassemblers at percentages proportional to the total values. That is, CLAD IDs are written to the first subschedule table SST1, which is referred to after the main schedule table MST, in such a manner that transmission privileges are allocated to the cell assembler/disassemblers at percentages proportional to the total values.

(4) For channels of the UBR category, transmission privileges are allocated to cell assembler/disassemblers based upon whether or not UBR channels are accommodated. That is, CLAD IDs are written to the second subschedule table SST2, which is referred to after the first subschedule table SST1, in such a manner that transmission privileges are allocated in regular order to cell assembler/ disassemblers that accommodate UBR channels.

(5) In order that the PCR in regard to a cell assembler/ disassembler for mixed UBR and VBR will not be limited, the physical rate (1.536 Mbps) of the trunk line is specified as the PCR value of this cell assembler/disassembler. The reason for not applying a PCR limitation to this cell assembler/disassembler is that originally there is no concept of a limitation in regard to the UBR service category and, hence, there is no need to apply a limitation.

If a CLAD in which VBR and UBR are mixed is accommodated while applying a PCR limitation and there is no traffic other than UBR traffic, the UBR traffic will not attain the maximum value (=1.536 Mbps) of the trunk line and the transmission rate will top out at the PCR value. In other words, UBR undergoes PCR limitation. Conversely, if a CLAD in which VBR and UBR are mixed is accommodated without a PCR limitation, VBR traffic will not be subjected to PCR restriction and VBR traffic in excess of the reported PCR will occur. However, since traffic control is performed in such a manner that the PCR value will not be exceeded, on a per-channel basis, in a cell assembler/disassembler, as mentioned above, VBR traffic above the reported PCR will not occur.

Thus, by virtue of traffic control in two stages (i.e., distributed traffic control), namely by the QOS controllers $61_1$–$61_3$ in the cell assembler/disassemblers $53_1$–$53_3$ and the ATM bus scheduler 51, the accommodation of multiple category channels in one and the same cell assembler/disassembler, which is not feasible with the prior-art implementation, becomes possible.

(C) Overview of Shortening of Transmission Delay of Low-speed CBR Media According to the Invention The allocation ratio in the main schedule table MST is the share with respect to the bands of the trunk lines. However, if transmission privileges in excess of the original percentages are granted in the main schedule table MST to cell assembler/disassemblers that accommodate CBR channels, as in the prior art (see FIG. 19), wasted bands that are not used become necessary and, moreover, extra bands must be assured from a network design viewpoint. According to the present invention, therefore, the problems encountered in the prior art are improved upon by granting, through the subschedule tables, more transmission opportunities to cell assembler/disassemblers that accommodate CBR channels.

In other words, according to the present invention:

(1) In the main schedule table MST, extra transmission privileges are not granted to cell assembler/disassemblers accommodating low-speed CBR channels, but rather transmission privileges are granted at a rate conforming to the original cell generating interval.

(2) In the first subschedule table SST1, the allocation of transmission privileges to cell assembler/disassemblers accommodating low-speed CBR channels is increased, and transmission opportunities are statistically increased for cell assembler/disassemblers accommodating low-speed CBR channels.

(3) If even less delay of cells on low-speed CBR channels is to be achieved, a plurality of subschedule tables are provided and transmission privileges are granted, only to cell assembler/disassemblers that accommodate low-speed CBR channels, in the subschedule table referred to after the main schedule. That is, a plurality of subschedule tables are provided, an order of priority is assigned in the order in which the subschedule tables are searched, and only cell assembler/disassemblers that accommodate low-speed CBR channels are allocated to the subschedule table having the highest priority.

(4) In a case where the main schedule table MST has a vacancy, a function code indicating that the first subschedule table SST1 is to be searched is set in this vacancy and the transmission opportunities for cell assembler/disassemblers that accommodate low-speed CBR channels are increased.

By virtue of the scheme set forth above, cell assembler/disassemblers that accommodate low-speed CBR channels need not be allocated extra bands from a network design viewpoint, bands are utilized effectively and delay involving CBR media (CBR traffic) is statistically reduced.

(D) ATM Bus Scheduler

Figure 2:
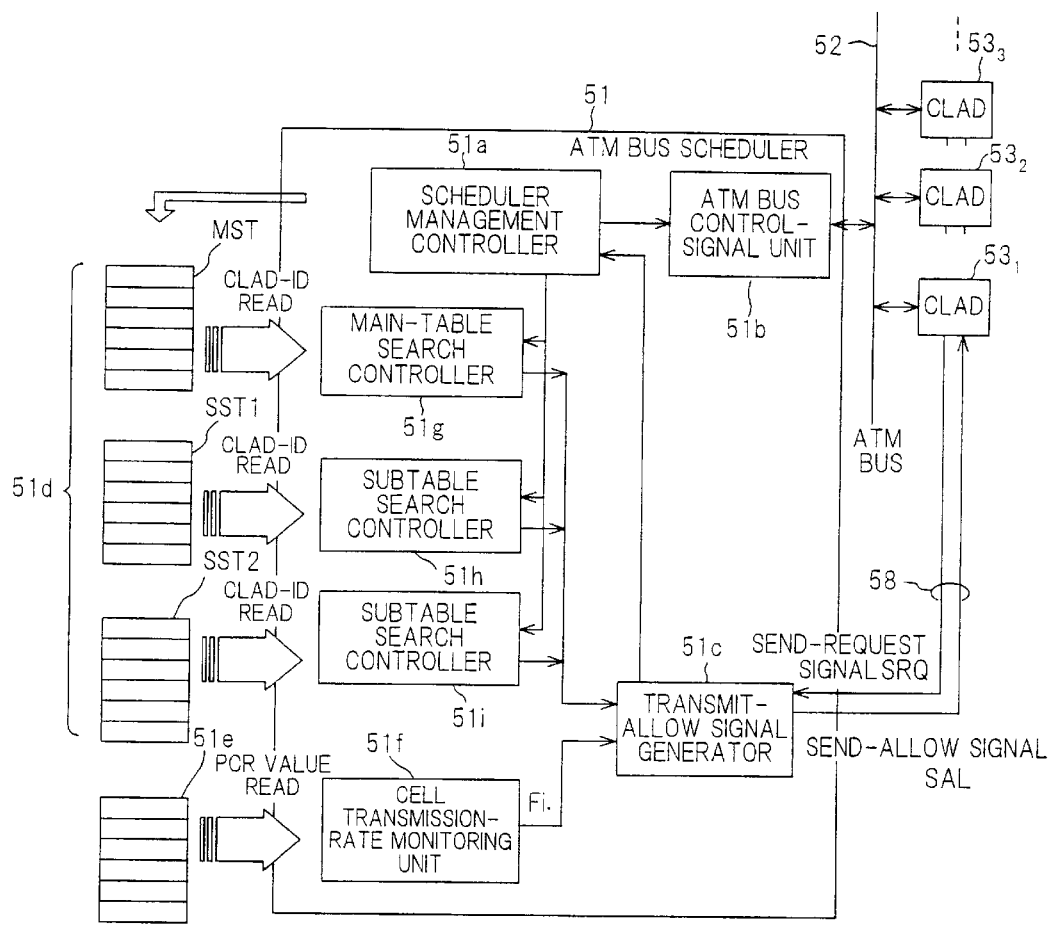
FIG. 2 is a diagram showing the structure of an ATM bus scheduler.

FIG. 2 illustrates the construction of the ATM bus scheduler 51. The ATM bus scheduler 51 includes a scheduler management controller 51a for controlling the overall scheduler and setting up a schedule; an ATM bus control-signal unit 51b for controlling the sending and receiving of cells on the ATM bus 52; a transmit-allow signal generator 51c for granting transmission privileges to each of the cell assembler/disassemblers $53_1$–$53_3$; a schedule table 51d, which has the main schedule table MST and the first and second subschedule tables SST1, SST2, for stipulating the cell transmission timings of the cell assembler/disassemblers; a PCR table 51e for storing the peak cell rate (PCR) of each cell assembler/disassembler; a cell transmission-rate monitoring unit 51f for counting the number of transmitted cells on a per-assembler/disassembler basis and performing monitoring to determine whether the cell transmission rate has exceeded the peak cell rate; and table-search controllers $51_g$–$51_i$ for searching the schedule tables MST, SST1 and SST2. The cell assembler/disassemblers $53_1$–$53_3$ are connected to the ATM bus 52 in parallel and to the ATM bus scheduler 51 by a control bus 58 so that various control signals (a send-request signal SRQ and a transmit-allow signal SAL) and data (reported rates SCR, PCR, etc.) may be sent and received.

The ATM scheduler management controller 51a sets the schedule tables MST, SST1, SST2 in accordance with the service category, peak cell rate PCR and sustained cell rate SCR, of each accommodated channel, reported beforehand from the cell assembler/disassemblers $53_1$–$53_3$ by processor-to-processor communication. For example, the ATM scheduler management controller 51a (1) totals the sustained cell rate SCR of each channel on a per-cell-assembler/disassembler basis and creates the main schedule table MST in such a manner that transmission privileges are granted to the cell assembler/disassemblers according at the percentages of total cell rates; (2) totals the maximum cell rate PCR of each nrt-VBR channel on a per-cell-assembler/disassembler basis and creates the first subschedule table SST1 in such a manner that transmission privileges are granted to the cell assembler/disassemblers at the percentages of total cell rates; and (3) creates the second subschedule table SST2 in such a manner that transmission privileges are granted to cell assemblers based upon whether a UBR channel is present or not on a per-cell-assembler/disassembler basis.

At the time of operation, the scheduler management controller 51a controls the table-search controllers $51_g$–$51_i$ on a per-time-slot basis, searches the schedule tables MST, SST1, SST2, decides the cell assembler/disassemblers having the transmission privilege and inputs this to the transmit-allow signal generator 51c.

The cell transmission-rate monitoring unit 51f counts the number of cells, which are transmitted from each of the cell assembler/disassemblers $53_1$–$53_3$ to the ATM bus, on a per-cell-assembler/disassembler over a fixed period of time, calculates the cell rate, performs monitoring to determine whether this cell rate has exceeded the maximum cell rate PCR reported from each cell assembler/disassembler, and inputs the result of monitoring to the transmit-allow signal generator 51c.

If a cell assembler/disassembler ID (CLAD ID) that has been allocated to a time slot of interest is received from the table-search controllers 51g, the transmit-allow signal generator 51c (1) determines whether the cell transmission rate in this cell assembler/disassembler has exceeded the total peak cell rate and (2) determines whether a cell to be transmitted to this cell assembler/disassembler exists (i.e., whether or not there is a send-request signal SRQ). If these conditions are satisfied, the transmit-allow signal generator 51c sends the send-allow signal SAL to this cell assembler/disassembler. The cell assembler/disassemblers $53_1$–$53_3$ transmit cells to the ATM bus 52 only if the are granted transmission privileges by the send-allow signal SAL. However, if a cell assembler/disassembler does not satisfy the conditions (1) and (2), or if the time slot of interest does not allocate the transmission privilege to any cell assembler/disassembler, then the transmit-allow signal generator 51c reports this to the scheduler management controller 51a.

In response to this report, the scheduler management controller 51a controls the table-search controller 51h, obtains the cell assembler/disassembler having the transmission privilege from the first subschedule table SST1 and inputs this to the transmit-allow signal generator 51c. The latter performs control similar to that described above and sends the send-allow signal SAL to this cell assembler/disassembler. However, if the cell transmission rate in this cell assembler/disassembler exceeds the total peak cell rate, or a cell to be transmitted to this cell assembler/disassembler does not exist, then this is reported to the ATM scheduler management controller 51a. In response to this report, the scheduler management controller 51a controls the table-search controller 51i, obtains the cell assembler/disassembler having the transmission privilege from the second subschedule table SST2 and inputs this to the transmit-allow signal generator 51c. The latter performs control similar to that described above and sends the send-allow signal SAL to this cell assembler/disassembler.

(E) ATM Bus Control of ATM Bus Scheduler

The ATM bus scheduler 51 performs schedule control of transmission privilege in two directions on the ATM bus 52, namely in the outbound direction (cell assembler/disassembler→trunk line) and inbound direction (trunk line→cell assembler/disassembler) to thereby perform overall control of traffic.

When a transfer is made in the inbound direction, a constant-rate transmission privilege is granted to the trunk line controller 54. The trunk line controller 54 sends a cell to the ATM bus at the constant rate and allows a prescribed cell assembler/disassembler to accept the cell.

When a transfer is made in the outbound direction, the transmission privilege is granted to a prescribed cell assembler/disassembler in accordance with the schedule and each of the cell assembler/disassemblers are allowed to sends cells to the ATM bus 52. The trunk line controller 54 accepts the cells on the ATM bus at a constant rate, time-division multiplexes the cells and sends them to the ATM network via the trunk line.

(a) Transfer in Inbound Direction

Figure 3:
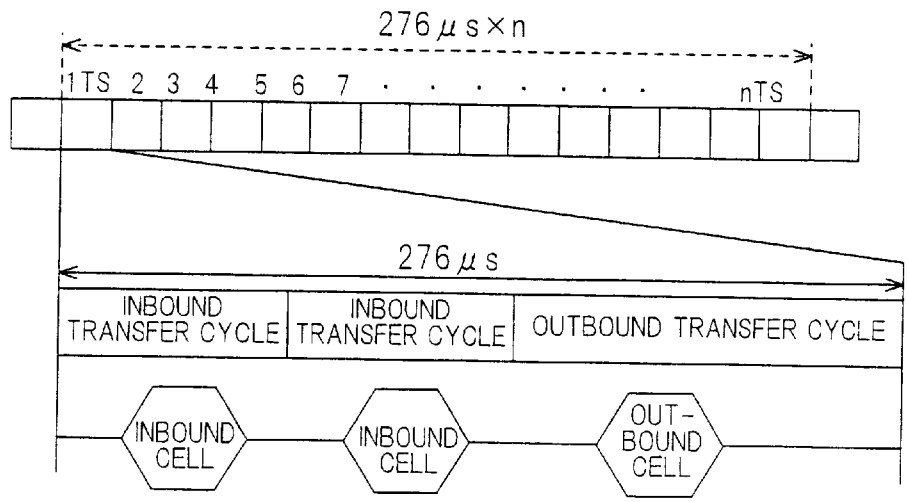
FIG. 3 is a diagram useful in describing a transfer scheme.

FIG. 3 is a diagram useful in describing allocation of bus access privilege with regard to the ATM bus 52 in a case where the number of trunk lines is one to two and the trunk-line speed is 1.536 Mbps. In such an example in which the speed of the trunk line is 1.536 Mbps, the cell transmission interval is 276 $\mu$s (=53×8/1.536×10$^6$ sec).

This interval is one time slot (1 TS) on the ATM bus.

In case of a single trunk line, the ATM bus is controlled in such a manner that cell transmission in the inbound direction and cell transmission in the outbound direction can each be performed one time in each time slot. In the case of two trunk lines, the ATM bus is controlled in such a manner that there will be two inbound transfer cycles and one outbound transfer cycle in each time slot. In this case, two cells that have been received from two trunk lines are transmitted to the ATM bus 52 at separate timings in one time slot.

Cells that have been transmitted to the ATM bus 52 are transmitted by broadcast to all of the cell assembler/disassemblers $53_1$–$53_3$ connected to the ATM bus. Set in advance in each of the cell assembler/disassemblers $53_1$–$53_3$ is a connection ID (VPI/VCI) for cells that are to be received by the cell assembler/disassembler. Since a cell transmitted from the trunk line controller 54 is broadcast on the ATM bus, all of the cell assembler/disassemblers receive the cell. Each cell assembler/disassembler searches the connection ID of the received cell and determines whether the cell is addressed to it. If a cell assembler/disassembler finds that the cell received from the ATM bus is addressed to it, the cell assembler/disassembler executes receive processing; otherwise, the cell is ignored.

Figure 4:
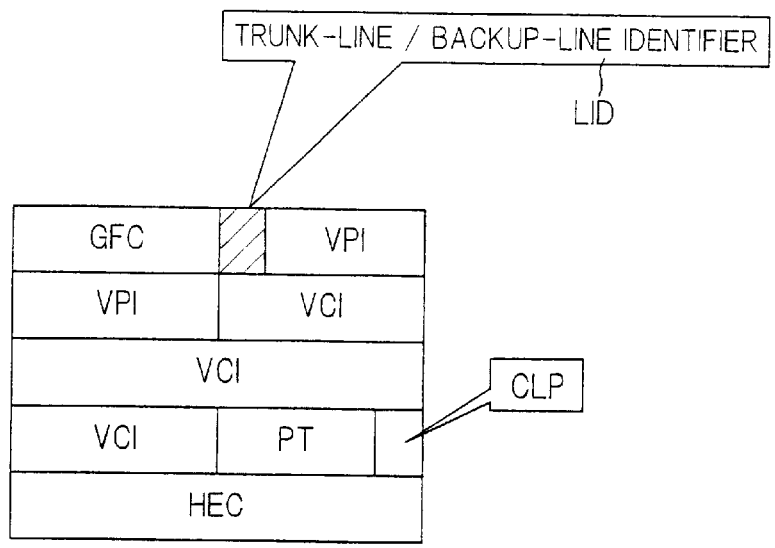
FIG. 4 is a diagram useful in describing an ATM header format having a line identifier.

In a case where there are a plurality of trunk lines (e.g., working line $57_1$, and backup line $57_2$), it is required that the cell assembler/disassemblers $53_1$–$53_3$ identify from which trunk line a received cell has been received. A line identifier for identifying the trunk line is placed in the ATM cell header. FIG. 4 is a diagram useful in describing a cell header having such a line identifier. A line identifier LID is set as the most significant bit of the cell header VPI. Referring to the line identifier LID makes it possible to identify from which trunk line a cell has been received. A cell received from the backup line $57_2$ has its line identifier LID made 1 in the backup line controller 55, and a cell received from the trunk line $57_1$ is passed with its LID being left at 0. A cell assembler/disassembler refers to the most significant bit (the line identifier LID) in the VPI of the received cell and can thus determine from which trunk line the cell was received.

(b) Transfer in Outbound Direction

A cell transfer in the outbound direction makes possible the transmission of only one cell in one time slot. Since a plurality of the cell assembler/disassemblers are connected to the ATM bus 52, contention will occur on the ATM bus if the cell assembler/disassemblers transmit cells at will. The ATM bus scheduler 51, which performs arbitration on the ATM bus in the outbound direction, is used to solve this problem. ATM bus arbitration will now be illustrated.

The ATM bus scheduler 51 grants a prescribed cell assembler/disassembler an outbound-cell transmission privilege in accordance with the schedule. The cell assembler/disassemblers $53_1$–$53_3$ sent cells to the ATM bus 52 only when the ATM bus scheduler 51 grants them the transmission privilege. The ATM bus scheduler 51 grants transmission privilege upon taking traffic control into consideration.

In a case where there are a plurality of trunk lines, a trunk line is selected through the following control: The cell assembler/disassembler sets a trunk-line/backup-line identifier as the most significant bit of the VPI. The trunk-line/backup-line identifier is an identifier for specifying to which trunk line a cell is to be transmitted. The trunk-line/backup-line identifier is set to 1 if the cell assembler/disassembler transmits a cell to the backup line $57_2$ and to 0 if the cell assembler/disassembler transmits a cell to the trunk line $57_1$. The trunk circuit controller 54 and back-up line controller 55 refer to the most significant bit of the VPI of the received cell, recognize whether the cell is addressed to it, accept the cell if it is addressed to it, time-division multiplex the cell and send it out over the line.

(F) Processing for Granting Transmission Privilege

Figure 5:
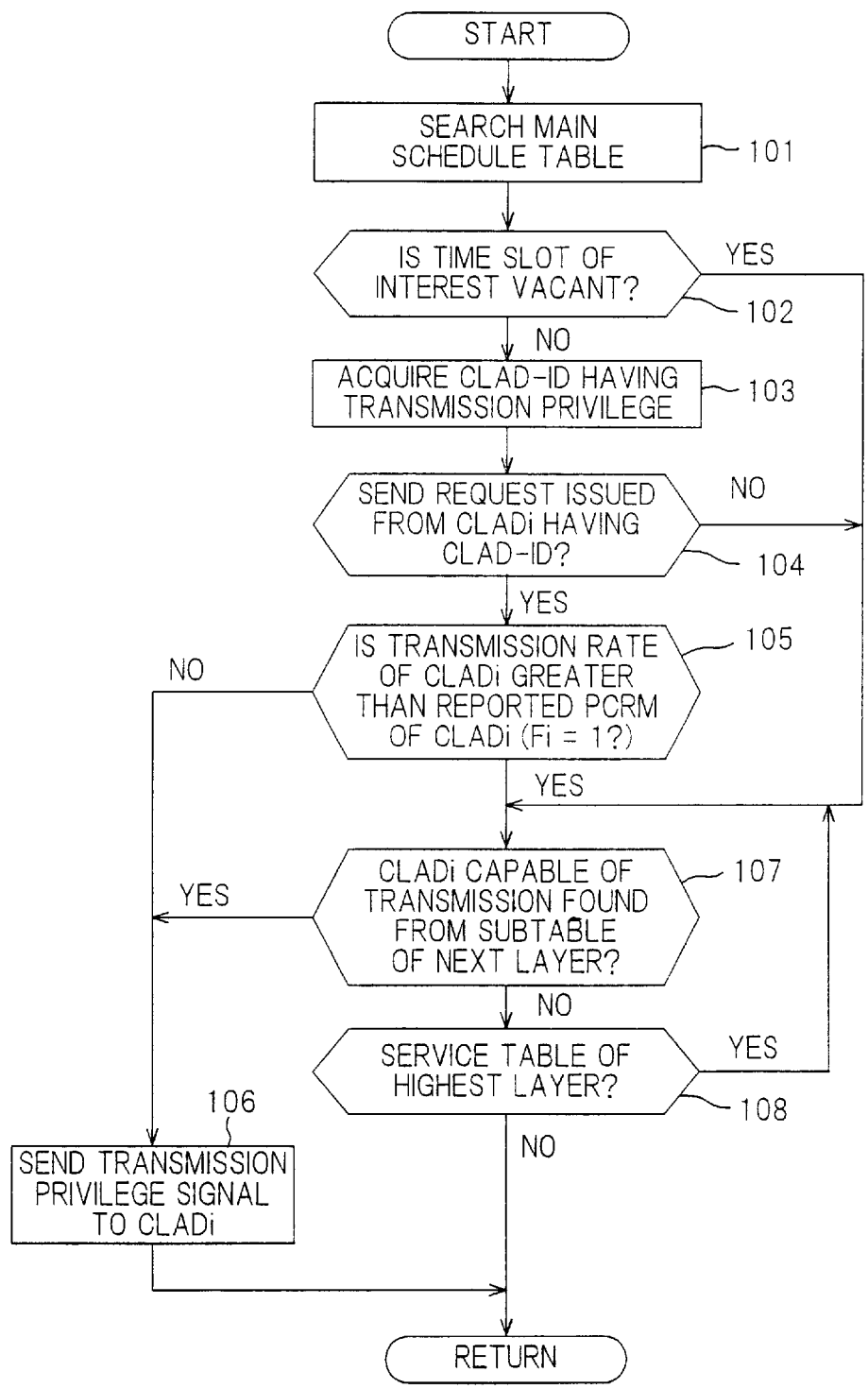
FIG. 5 is a flowchart of processing for granting transmission privilege to a cell assembler/disassembler ($CLAD_i$)

FIG. 5 is a flowchart of processing executed by the ATM bus scheduler 51 to grant transmission privilege.

First, the ATM bus scheduler 51 searches the main schedule table MST (step 101) and determines whether a time slot of interest is vacant (step 102). If the time slot is not vacant and the CLAD ID of a certain cell assembler/disassembler has been written in the time slot, the ATM bus scheduler 51 determines whether a send request has been issued by the cell assembler/dis-assembler $53_i$ specified by the aforesaid CLAD ID (steps 103, 104). If a send request has been issued, the ATM bus scheduler 51 determines whether the transmission rate FRi of this cell assembler/disassembler $53_i$ is greater than the peak cell rate PCR (step 105). Peak cell rate PCRM is a value obtained by totaling the reported peak cell rates PCR of all channels accommodated by the cell assembler/disassembler. If FRi<PCRM holds, the send-allow signal SAL is sent to the cell assembler/disassembler $53_i$ (step 106). As a result, the cell assembler/disassembler 53i sends a cell to the ATM bus. It should be noted that step 105 can include a condition in addition to the condition FRi<PCRM. Specifically, the sustained transmission rate can be calculated and the additional condition is that the calculated sustained transmission rate be lower than the reported sustained transmission rate. The transmit allow signal would be generated if this condition were satisfied as well. The reported sustained cell rate is a value obtained to totaling the reported sustained cell rates SCR of each of the channels accommodated by a cell assembler/disassembler.

If FRi>PCRM is found to hold at step 105, the ATM bus scheduler 51 searches the first subschedule table SST1 and checks to determine whether a cell assembler/disassembler that is capable of transmission has been found (step 107). That is, the ATM bus scheduler 51 checks to see whether the cell transmission rate does exceed the total peak cell rate and, moreover, whether a cell assembler/disassembler for which a cell to be transmitted exists has been found. It should be noted that the position at which searching starts in the first subschedule table SST1 is the position that follows that at which the preceding search ended.

If a cell assembler/disassembler that is capable of transmission has been found, the ATM bus scheduler 51 sends the send-allow signal SAL to this cell assembler/disassembler (step 106). In response, the cell assembler/disassembler 53i sends a cell to the ATM bus. If a cell assembler/disassembler that is capable of transmission is not found even after one cycle of the first subschedule table SST1, however, the ATM bus scheduler 51 checks to see whether there is a next schedule table (step 108). If there is, the ATM bus scheduler 51 searches the second subschedule table SST2 and obtains a cell assembler/disassembler that is capable of transmission (step 107). If a cell assembler/disassembler that is capable of transmission is not found even after similar processing is thenceforth executed and the last subtable is searched, the ATM bus scheduler 51 does not send a cell to the ATM bus in this time slot of interest and repeats the processing from step 101 onward in regard to the next time slot.

If it is found at step 104 that no cell transmission request has been issued from the cell assembler/disassembler $53_i$ obtained from the main schedule table MST, then the ATM bus scheduler 51 executes processing from step 107 onward. If it is found at step 102 that the time slot of interest is vacant and that a function code indicating search of a subschedule table has been written in this time slot, then the ATM bus scheduler 51 likewise executes processing from step 107 onward.

(G) Processing for Monitoring Cell Transmission Rate

Figure 6:
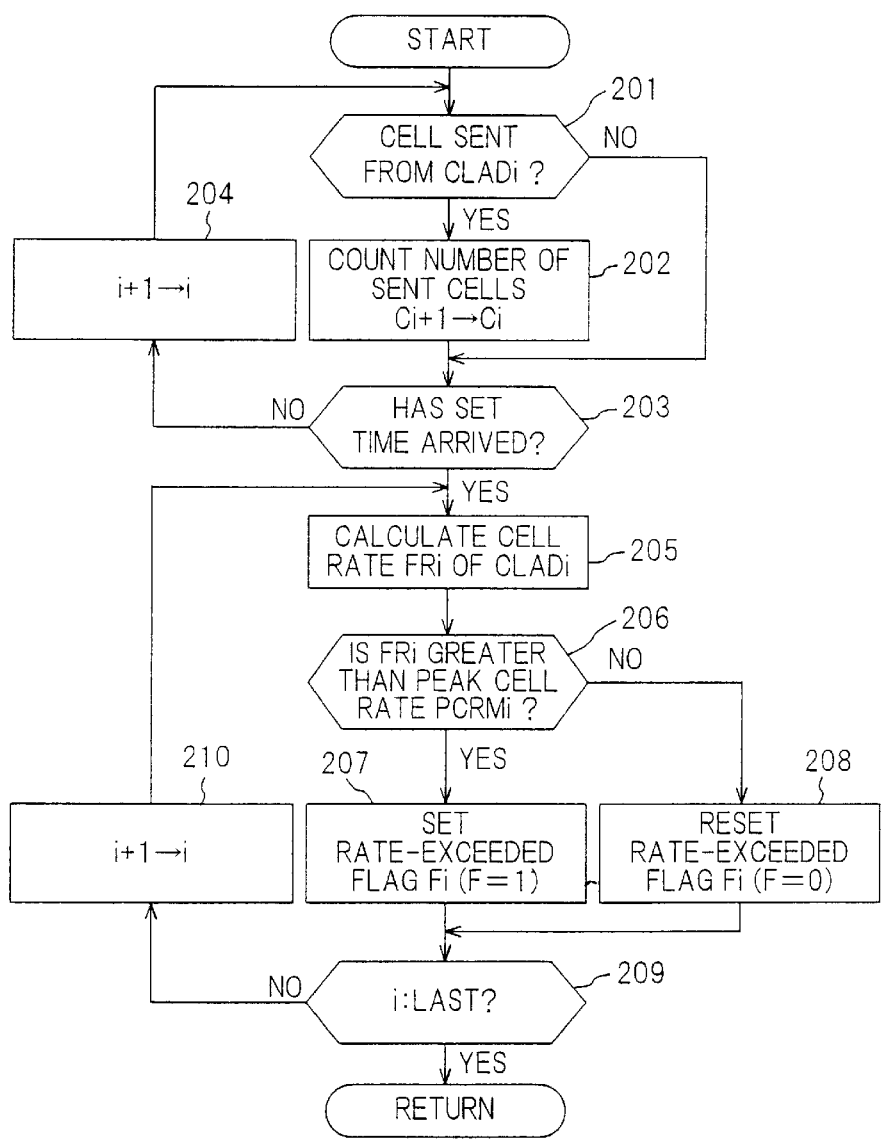
FIG. 6 is a flowchart of processing for monitoring executed in a cell transmission-rate monitoring unit.

FIG. 6 is a flowchart of monitoring processing executed by the cell transmission-rate monitoring unit 51f.

The cell transmission-rate monitor 51f determines whether a cell has been sent from an ith cell assembler/disassembler (step 201). If the answer is "YES", then the monitoring unit 51f counts up the number of cells sent by the ith cell assembler/disassembler (step 202). The monitoring unit 51f then determines whether a set time has arrived (step 203). If the answer is "NO", then i is incremented (step 204) and processing from step 201 onward is repeated.

If the set time has arrived, the cell transmission-rate monitoring unit 51f calculates the cell rate FRi of the ith cell assembler/disassembler (step 205) and compares the magnitude of FRi with that of the peak cell rate PCRMI of the ith cell assembler/disassembler obtained from the reported cell rate (step 206). A cell-rate-exceeded flag Fi is made "1" if the cell rate FRi is greater than the peak cell rate PCRMI and is made "0" if FRi is less than PCRMi. This is then input to the transmit-allow signal generator 51c (steps 207, 208). The cell transmission-rate monitoring unit 51f determines whether this processing has been completed for all of the cell assembler/disassemblers (step 209). If the answer is "NO", then i is incremented (step 210) and processing from step 205 onward is repeated.

(H) Structure of Cell Assembler/disassembler

Figure 7:
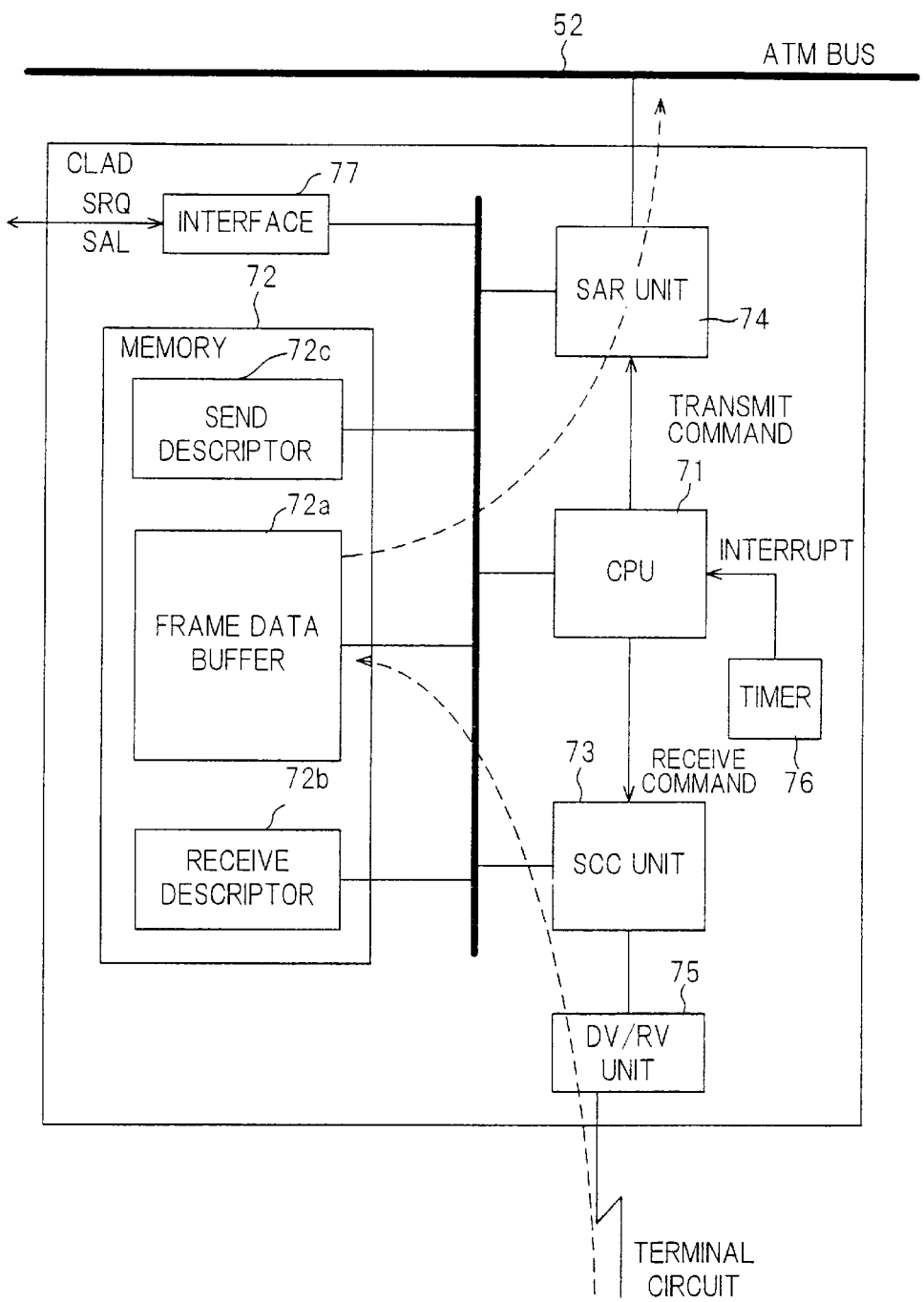
FIG. 7 is a diagram showing the hardware implementation of a cell assembler/disassembler (CLAD)

FIG. 7 is a diagram showing the hardware implementation of the cell assembler/disassemblers $53_1$–$53_3$. The device includes a CPU 71 for overall control of the cell assembler/disassembler; a memory 72 provided with a frame buffer 72a, a receive descriptor 72b and a transmit descriptor 72c; an SCC (Serial Communication Controller) 73, a SAR (cell assembling and disassembling controller) 74, a DV/RV (line physical interface terminator) 75, a timer 76 and an interface 77.

The CPU 71, which operates in accordance with software in a program memory, performs the following control:

(1) The CPU 71 writes and reads frame data, which is received by the SCC 73, to and from the frame buffer 72a, creates and manages the receive descriptor [channel number (DLCI number) and frame data length (frame storage address, etc.], and instructs the SCC 73 to receive a frame.

(2) Using the receive descriptor, the CPU 71 creates the transmit descriptor, which indicates the storage address, frame length and VPI, VCI values of frame data to be delivered to the SAR 74, and requests transmission to the SAR 74.

Figure 8:
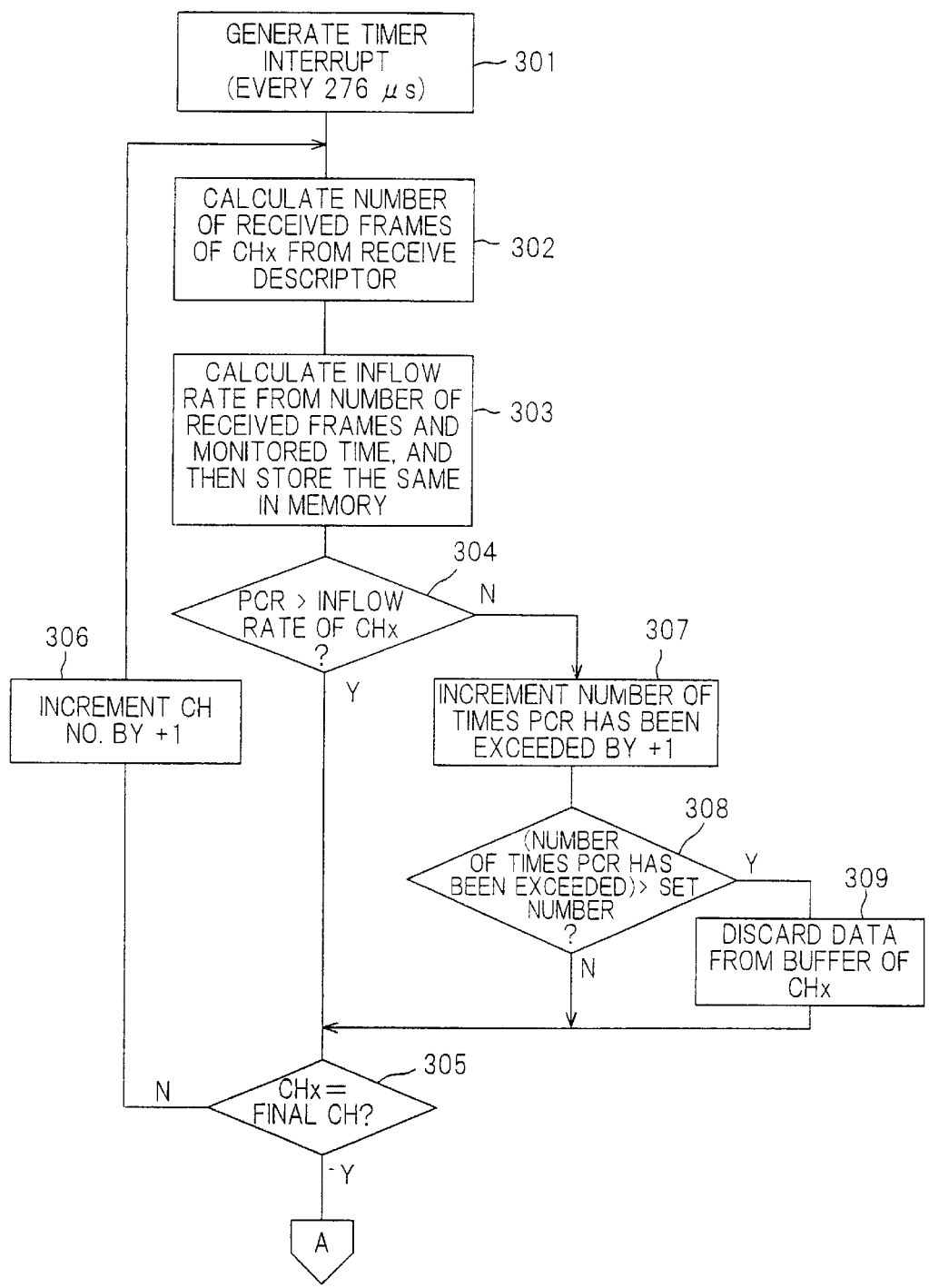
FIG. 8 shows an algorithm (part 1) for QOS control in a cell assembler/disassembler (CLAD)
Figure 9:
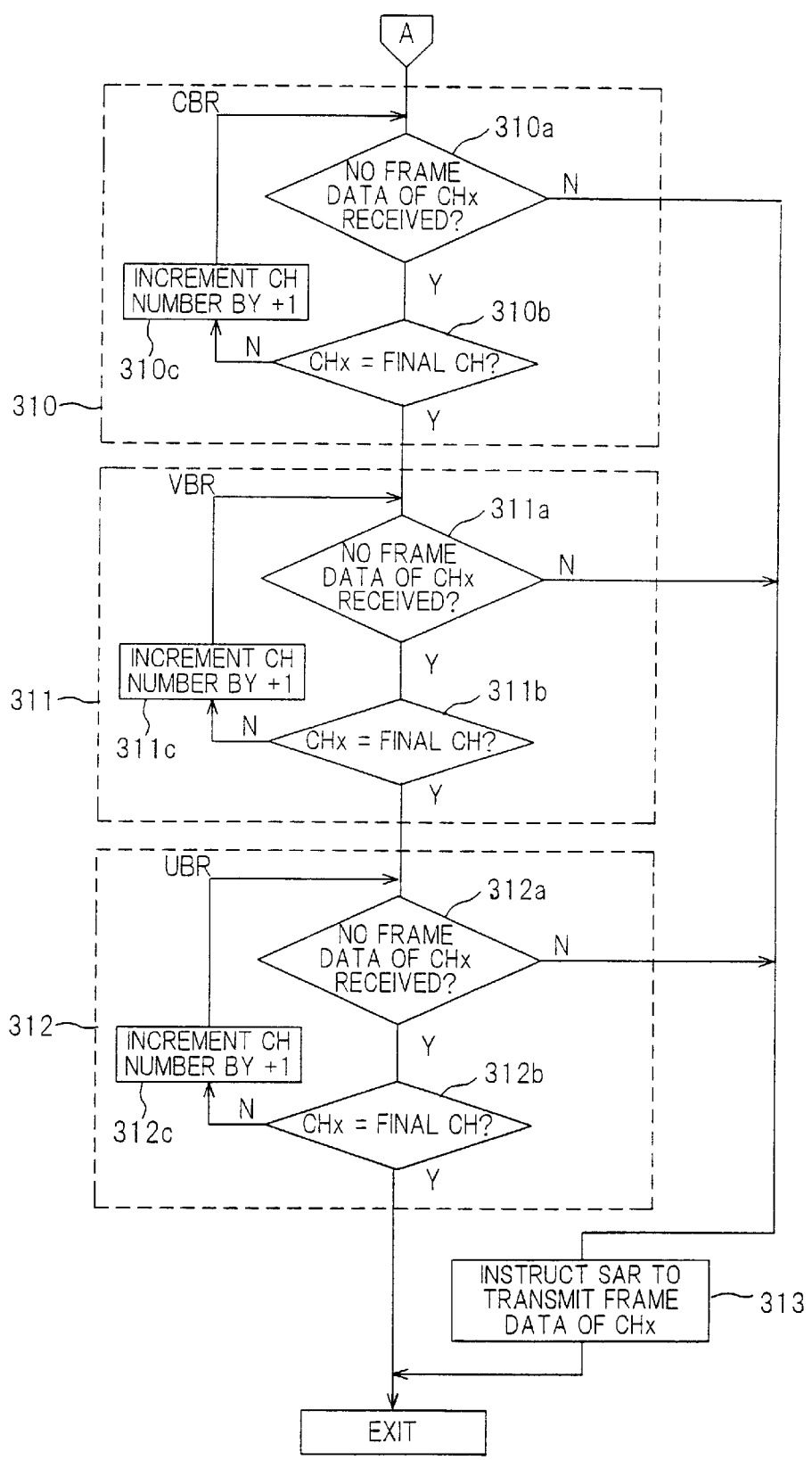
FIG. 9 shows an algorithm (part 2) for QOS control in a cell assembler/disassembler (CLAD)

(3) As illustrated in the flowcharts of FIGS. 8 and 9, the CPU 71 measures the traffic of the inflow of received frames per channel at regular intervals in response to a periodic timer interrupt from the timer 76, compares the measured value of each channel with the PCR value and decides whether to request transmission to the SAR 74.

(4) The CPU 71 monitors the amount of content in a receive buffer for each channel and discards, frame by frame, any frames that cannot be transmitted even when the stored frames have reached a fixed quantity.

The SCC 73 terminates (with flag synchronization frame synchronization, etc.) a voltage-converted serial signal of TTL level from the DV/RV 75 and extracts frame data. Next, the SCC 73 transfers frame data to the location of the receive-storage address specified by the CPU 71 and writes the parameters (reception-complete flag, received frame length) of the receive descriptor.

If instructed by the CPU 71 to transmit, the SAR 74 reads frame data from memory, assembles the data into cells and sends the cells to the ATM bus 52 in accordance with transmit descriptor (frame data storage address, frame length and VPI/VCI values) of the channel for which transmission has been specified. As for the cell transmission timing, the send-request signal SRQ is output to the ATM bus scheduler 51 after a frame is assembled into cells, and one cell only is sent to the ATM bus 52 when the send-allow signal SAL is sent back from the ATM bus scheduler 51, which performs overall control of statistical multiplexing of the ATM bus.

(I) QOS Control

The monitoring of traffic flow rate of transmitted cells performed by cell assembler/disassemblers, control of cell rate and control of the frame buffer are carried out by the CPU 71 in accordance with software on the basis of previously defined parameters (category type, PCR value and SCR value) of each channel. FIGS. 8 and 9 are processing flowcharts illustrating an algorithm for such QOS control.

A timer interrupt is applied to the CPU 71 by the timer 76 (step 301) at the cell generation intervals (every time slot) stipulated by the physical speed of the trunk lines of the ATM cell multiplexing apparatus. One time slot is 276 $\mu$s if the physical speed of the trunk line is 1.536 Mbps. With generation of the interrupt serving as a trigger, the number of received frames is calculated (step 302) from the difference between the number of received frames on an ith channel the last time and the number of received frames this time, frame inflow rate FVi is calculated from the calculated number of frames and the time of one time slot, and the inflow rate is stored in memory (step 303).

Next, the peak cell rate PCR set in advance for the ith channel and the frame inflow rate FVi are compared (step 304). If the peak rate is larger, it is determined whether processing for calculating frame inflow rate has been completed for all accommodated channels (step 305). If this processing has not been completed, the channel number i is incremented (step 306) and processing from step 302 onward is repeated.

If it is found at step 304 the frame inflow rate FVi is greater than the peak rate, the number of times PCR has been exceeded is incremented (step 307). It is then determined whether the number of times PCR has been exceeded is greater than a set number of times (step 308). If the answer is "NO", the processing of step 305 is executed. If the answer is "YES", frame data is discarded from the buffer of the ith channel (step 309) and the processing of step 305 is executed.

If it is found at step 305 that the above-described processing has been completed for all channels, then, for step 310 onward, whether or not frames have been received is determined in the order of priority CBR→VBR→UBR. If reception is determined, the SAR 74 is instructed to transmit a cell over the applicable channel. By making the order of the search the order of priority even within the same category, priority/non-priority control between channels becomes possible.

First, it is determined whether there is reception of frame data on the ith channel among the CBR channels of highest priority (step 310). If there is reception of data, the SAR 74 is instructed to transmit frame data received from the CBR channel of interest (step 313) and then processing is exited. If there is no reception of frame data on the ith channel, then it is determined whether there is another CBR channel (step 310b). If there is another CBR channel, i is incremented (step 310c) and the processing of step 310a is executed with regard to the next CBR channel.

If it is found at step 310b there are no other CBR channels, i.e., if frame data has not been received from any CBR channel, then processing similar to that for the CBR channels is executed in regard to VBR channels (step 311). If reception of frame data is found in regard to any VBR channel, then the SAR 74 is instructed to transmit frame data received from the VBR channel of interest (step 313) and processing is exited. If frame data has not been received from any VBR channel, on the other hand, then similar processing is executed in regard to UBR channels (step 312).

If reception of frame data is found in regard to any UBR channel, then the SAR 74 is instructed to transmit frame data received from the UBR channel of interest (step 313) and processing is exited. If frame data has not been received from any UBR channel, on the other hand, then processing is exited without instructing the SAR 74 to transmit.

(J) Cell Generation Processing

Figure 10:
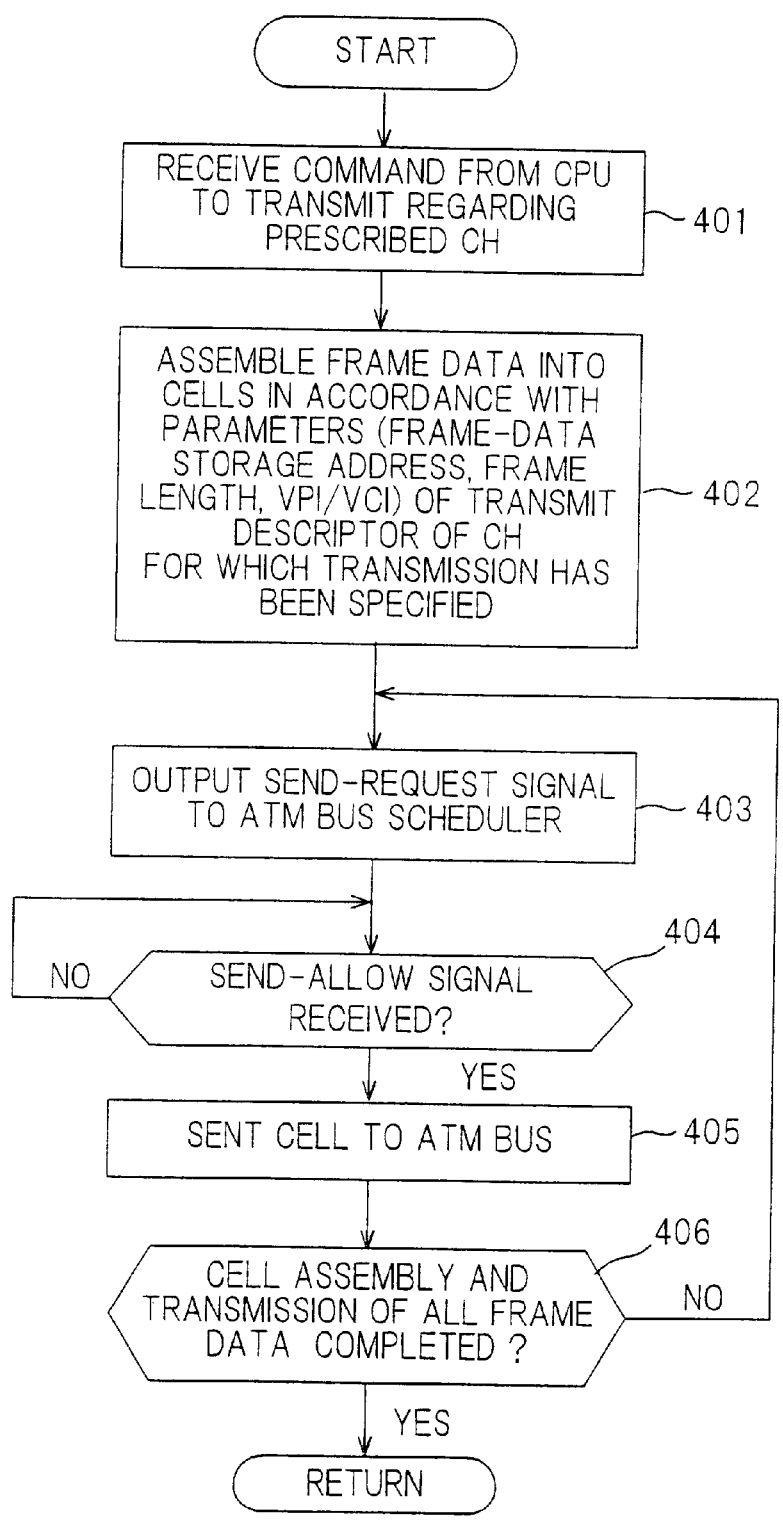
FIG. 10 is a flowchart of processing executed by a SAR (cell assembling and disassembling) unit.

FIG. 10 is a flowchart of cell transmission processing executed by the SAR (cell assembling and disassembling) unit 74.

If instructed to transmit by the CPU 71 in regard to a certain channel (step 401), the SAR 74 assembles frame data into cells in accordance with the parameters (frame data storage address, frame length and VPI/VCI, etc.) of the transmit descriptor of the channel for which transmission has been specified (step 402).

Next, the SAR 74 transmits the send-request signal SRQ to the ATM bus scheduler 51 (step 403) and waits for reception of the send-allow signal SAL (step 404). If the send-allow signal SAL is received, the SAR 74 sends a cell to the ATM bus 52 (step 405) and it is determined whether cell assembly and transmission of all frame data have been completed (step 406). If the answer is "NO", the processing from step 403 onward is repeated.

(K) Examples of Schedule Table Settings

Figure 11A:
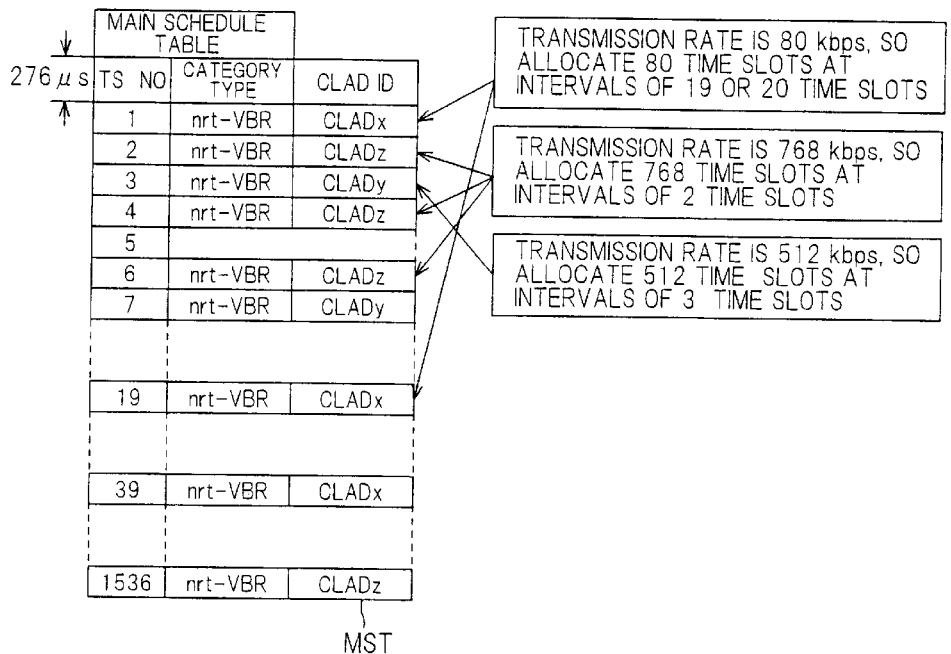
FIGS. 11A, 11B and 11C are examples of settings in schedule tables in distributed traffic control.
Figure 11B:
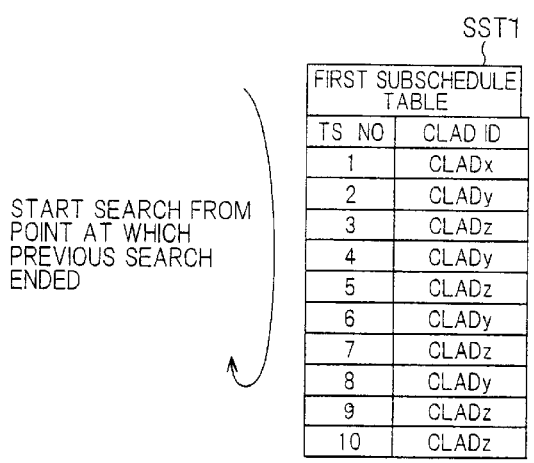
Figure 11C:
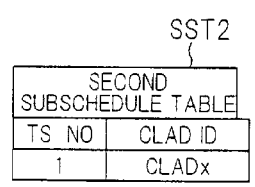

FIGS. 11A, 11B and 11C are examples of settings in schedule tables MST, SST1, SST2 for linkage with QOS control described above. It is assumed here that a cell assembler/disassembler CLADx (where x represents the CLAD number) accommodates two nrt-VBR channels and one UBR channel, and that the physical speed of the trunk line, sustained cell rate SCR and peak cell rate PCR of each channel are as follows: Trunk line speed of ATM cell multiplexer: 1.536 Mbps

| CH1: | nrt-VBR | SCR: | 64 kbps, | PCR: | 128 kbps |
|---|---|---|---|---|---|
| CH2: | nrt-VBR | SCR: | 16 kbps, | PCR: | 64 kbps |
| CH3: | UBR | SCR/PCR | Not specified | | |

(1) Since the speed of the trunk line is 1.536 Mbps, the transmission interval of one cell is 276 $\mu$s (=53×8/1.536×10$^6$ sec). This interval serves as one time slot (TS) on the ATM bus. Since the main schedule table MST is such that 1536 time slots constitute one cycle, one cycle is 53×8/10$^3$ (sec) and the transmission rate of one time slot is 1 kbps.

The set allocation of transmission privilege with respect to the cell assembler/disassemblers CLADx is decided in accordance with the sustained cell rate SCR.

The SCR of the cell assembler/disassembler CLADx is the sum total of the SCRs of the channels. Accordingly, 80 kbps (=64 kbps+16 kbps) is the sustained cell rate SCR of the cell assembler/disassembler CLADX. This 80 kbps is equally distributed to the time slots of the main schedule table MST at a percentage with respect to the overall trunk line speed of 1536 kbps. Since the number of time slots of the main schedule table MST is 1536 (1 TS=1 kbps), as mentioned earlier, a total of 80 time slots are allocated for the nrt-VBR channel of the CLADx at intervals of 19 and 20 time slots, as illustrated in FIG. 11A.

Further, the sustained cell rates SCR and peak cell rates PCR are as follows classified by the service category of the cell assembler/disassemblers CLADx, CLADy, CLADz:

| | | | | | | |
|---|---|---|---|---|---|---|
| CLADx: | nrt-VBR | UBR | SCR: | 80 kbps, | PCR: | 192 kbps |
| CLADy: | nrt-VBR | SCR | SCR: | 512 kbps | PCR: | 768 kbps |
| CLADz: | nrt-VBR | SCR | SCR: | 768 kbps | PCR: | 960 kbps |

Here 512 time slots are allocated to CLADy and 768 to CLADz. The peak cell rate of the cell assembler/disassembler CLADx is the sum total (=128+64) kbps of the PCRs of the channels.

(2) In the setting of the first subschedule table SST1 for nrt-VBR, transmission privileges are distributed equally at the percentages of the peak cell rates PCR of the cell assembler/disassemblers. Accordingly, if the number of time slots is ten, as shown in FIG. 11B, one is allocated to CLADx, four to CLADy and five to CLADZ (192:768:960= 1:4:5) in the first subschedule table SST1.

(3) The setting of the second subschedule table 15 SST2 for UBR is carried out by allocating CLAD numbers of the UBR-channel accommodating cell assembler/disassemblers in order. Accordingly, if the number of time slots is one, one CLADx is allocated, as illustrated in FIG. 11C.

Since UBR basically is a category for which no transmission rate is defined, the numbers of each of the CLAD numbers set in the second subschedule table SST2 are allocated equally (at least one). However, in a case where it is desired to weight transmission rates between UBRs, the ratio of the set numbers of each of the CLAD numbers can be changed.

(4) The ATM bus scheduler 51 constantly measures the transmission rate on a per-cell-assembler/disassembler basis by the monitoring processing of FIG. 6 and, by the processing for granting transmission privilege shown in FIG. 5, controls the transmission of cells in accordance with the schedule of the schedule tables and upon judging whether cells to be transmitted are present or not and whether the transmission rate has exceeded the peak cell rate. As a result, transmission rate is limited so as not to exceed the set PCRs of the cell assembler/disassemblers, and each cell assembler/disassemblers is not allowed to transmit at a rate greater than the set PCR.

It should be noted that no limit is placed upon the set value of PCR for a cell assembler/disassembler for mixed VBR, UBR services and that PCR control of VBR is left to QOS control in the cell assembler/disassembler (see FIGS. 8 and 9). By not placing any limit on the set value of PCR, the peak transmission rate only in UBR traffic can be made the physical rate of the trunk line.

The set value of PCR of a cell assembler/dis-assembler solely for the VBR channel or of a cell assembler/disassembler solely for the UBR channel is as before. In the case of the VBR channel alone, the sum total of the PCRs of the channels is set as the peak cell rate. In the case of the UBR channel alone, the rate is unlimited.

Thus, even if one cell assembler/disassembler accommodates a plurality of channels of different service categories, traffic control is carried out by a two-stage distributed scheme employing the ATM bus scheduler and the cell assembler/disassemblers. As a result, stringent traffic control specific to ATM protocols can be realized.

Figures 12A, 12B, 12C:
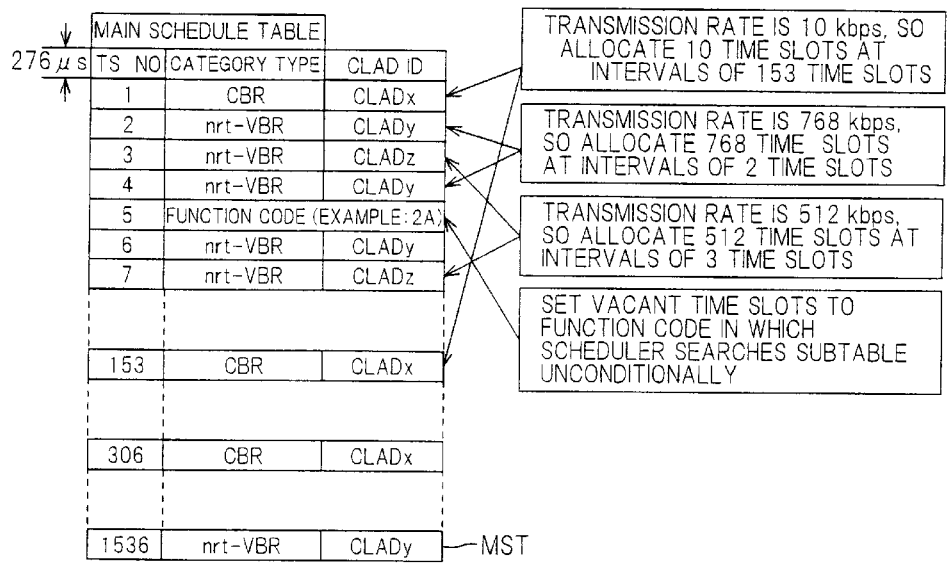
FIGS. 12A, 12B and 12C are examples of settings in schedule tables for realizing little delay with respect to low-speed CBR media.
Figure 14:
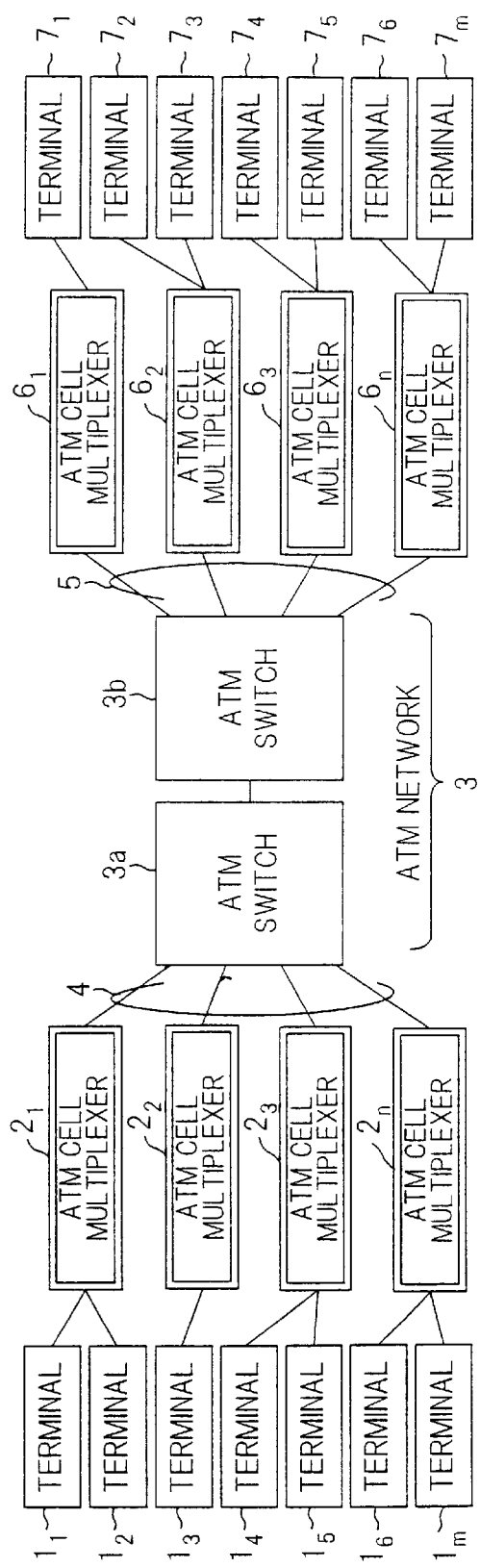
FIG. 14 is a diagram showing the placement of ATM cell multiplexers according to the prior art.
Figure 15:
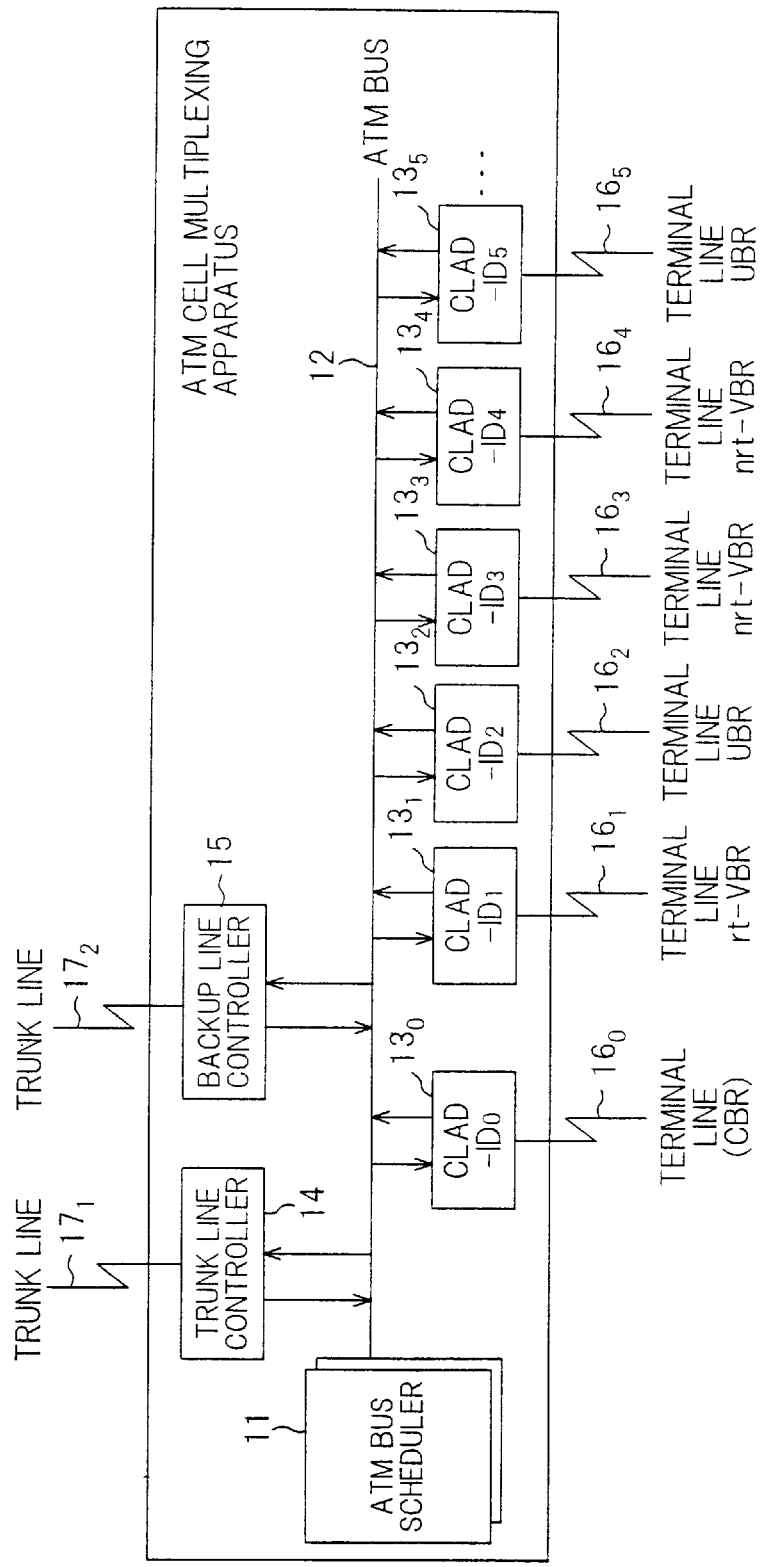
FIG. 15 is a block diagram showing the structure of an ATM cell multiplexer that has been proposed.
Figure 16:
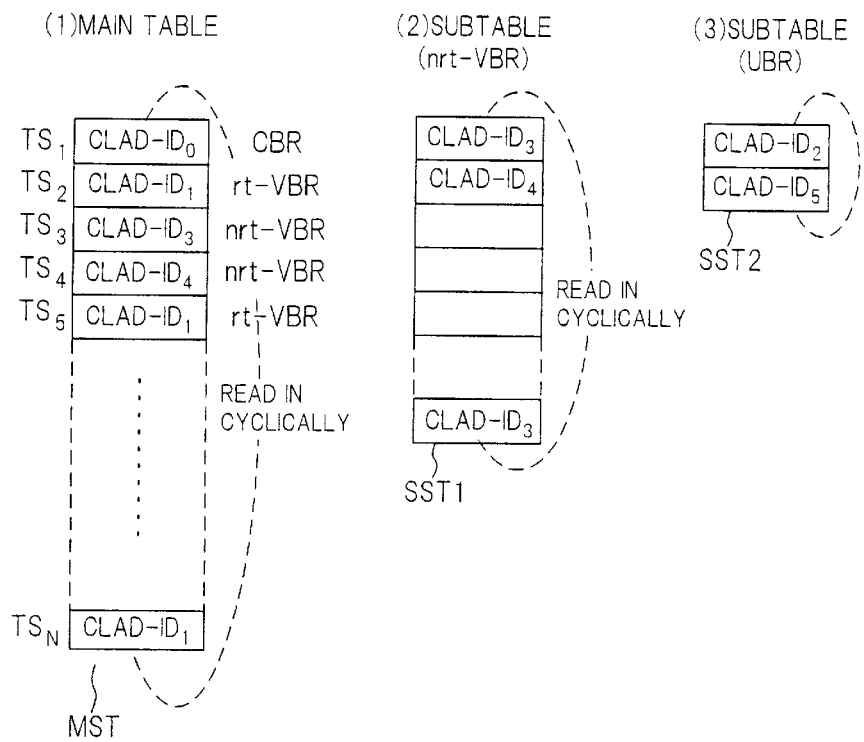
FIG. 16 is a diagram useful in describing schedule tables.
Figure 18:
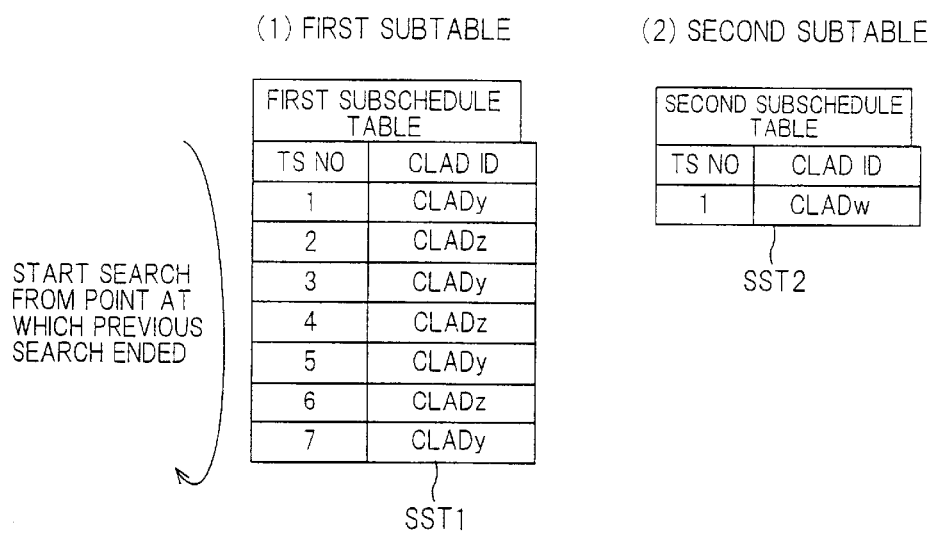
FIG. 18 shows an example of settings in a schedule table (a subschedule table)
Figure 17:
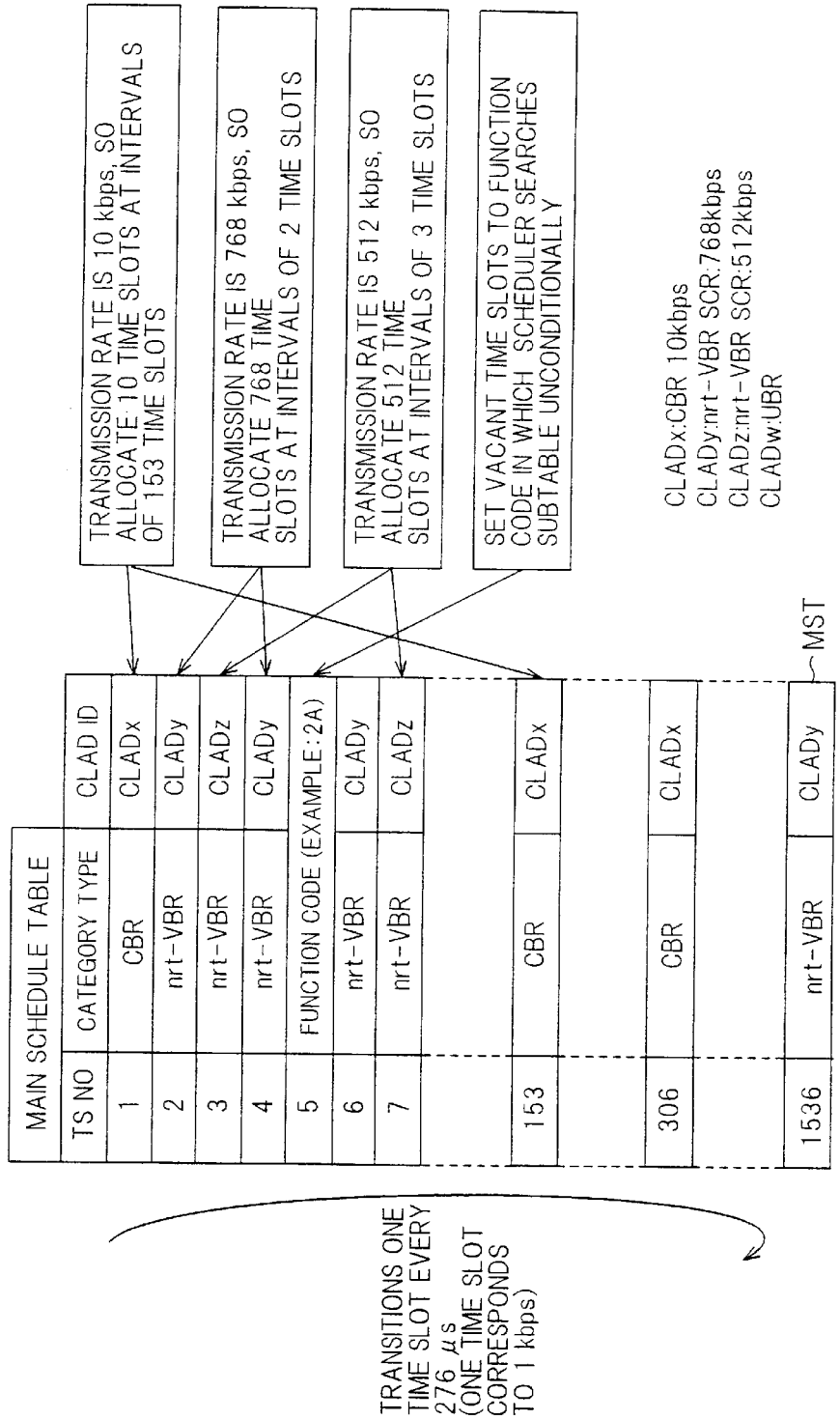
FIG. 17 shows an example of settings in a schedule table (a main schedule table)

(L) First Schedule Control for Implementing Reduced Delay with Regard to Low-speed CBR Media FIGS. 12A to 12C are diagrams useful in describing schedule tables for low-speed CBR media in accordance with the present invention. Here CLADx is a cell assembler/disassembler accommodating the low-speed CBR channel, CLADy a cell assembler/disassembler accommodating the nrt-VBR channel, and CLADz a cell assembler accommodating the nrt-VBR and UBR channels. The parameters of each are as follows: Trunk line speed of ATM cell multiplexer: 1.536 Mbps

| | | | | | |
|---|---|---|---|---|---|
| CLADx: | CBR 10 kbps | | | | |
| CLADy: | nrt-VBR | SCR: | 768 kbps | PCR: | 1024 kbps |
| CLADZ: | nrt-VBR | SCR: | 512 kbps | PCR: | 768 kbps + UBR |

Since the speed of the trunk line is 1.536 Mbps, the transmission interval of one cell is 276 $\mu$s. This interval serves as one time slot (TS) on the ATM bus. Since the main schedule table MST is such that 1536 time slots constitute one cycle, one cycle is $53 \times 8/10^3$ (sec) and the transmission rate of one time slot is 1 kbps.

(1) In the setting of the main schedule table MST, the allocation of transmission privileges to the cell assembler/disassemblers CLADx, CLADy, CLADz is decided in accordance with the sustained cell rate SCR. The sum total 1290 kbps of the SCRs (=10 kbps+768 kbps+512 kbps), therefore, is equally distributed at a percentage with respect to the overall speed (=1536 kbps) of the trunk line. Since the number of time slots of the main schedule table MST is 1536 (1 TS=1 kbps), the number allocated to each of the cell assembler/disassemblers is as follows: 10 for CLADx, 768 for CLADy, 512 for CLADz and 246 for vacant time slots.

As for the order of time-slot allocation to the main schedule table MST, allocation is performed preferentially in the aforesaid order CBR→rt-VBR→nrt-VBR. Accordingly, first ten time slots (see FIG. 12A) are allocated to CLADx at equal intervals in such a manner that CLADx will appear every 153 or 154 time slots; then 768 time slots are allocated to CLADy at equal intervals in such a manner that CLADy will appear every 2 or 3 slots; and finally 512 time slots are allocated to CLADz at equal intervals in such a manner that CLADz will appear every 3 slots. Function codes (e.g., 0x2A) are filled in all of the remaining time slots in such a manner that the ATM bus scheduler 61 will make a transition to and search the subtables unconditionally.

(2) In the setting of the first subschedule table SST1 for nrt-VBR, transmission privileges are distributed equally at the percentages of the maximum cell rates PCR of the cell assembler/disassemblers accommodating the nrt-VBR channel. Accordingly, in the prior art, four time slots are allocated to CLADy and three to CLADz (1024:768=4:3) in the first subschedule table SST1. According to the present invention, however, in a case where a low-speed CBR channel is accommodated, even if the cell assembler/disassembler is a CLADx not accommodating the VBR channel, the transmission privilege is allocated to the cell assembler/disassembler CLADx in the first subschedule table SST1, as shown in FIG. 12B. As a result, more transmission opportunities can be granted to cell assembler/dis-assemblers that accommodate the low-speed CBR channel.

More specifically, the number of time slots of the first subschedule table SST1 is 14, seven time slots are allocated to the cell assembler/disassembler CLADx, four to the cell assembler/disassembler CLADy and three to the cell assembler/disassembler CLADz. By creating the subschedule table in this manner, transmission opportunities can be granted to the cell assembler/dis-assembler CLADx at a probability of 50% by referring to the first subschedule table SST1 (i) in a case where there is no cell to be transmitted to a cell assembler/disassembler that has been allocated to a time slot of interest in the main schedule table MST, or (ii) in a case where the cell transmission rate in this cell assembler/disassembler exceeds the peak cell rate, or (iii) in a case where the time slot of interest is vacant.

(3) The setting of the second subschedule table SST2 for UBR is carried out by equally allocating CLAD numbers of UBR-channel accommodating cell assembler/dis-assemblers one at a time in regular order. Accordingly, one CLADz is allocated to the second subschedule table SST2, as illustrated in FIG. 12C. In a case where it is desired to weight transmission rates between UBRs, the ratio of the set numbers of each of the CLAD numbers is decided in dependence upon the percentages of the transmission rates.

If the schedule tables are set up as described above, executing the processing of FIG. 5 for granting transmission privilege makes it possible to provide cell assembler/disassemblers that accommodate low-speed CBR channels with more transmission opportunities in a case where a trunk band is vacant. Thus, transmission opportunities can be statistically increased for cell assembler/disassemblers accommodating low-speed CBR channels. Further, since the number of allocations for low-speed CBR is not increased in the main schedule table MST, bands can be utilized effectively.

(M) Second Schedule Control for Implementing Reduced Delay with Regard to Low-speed CBR Media The embodiment of first schedule control shown in FIG. 12 provides cell assembler/disassemblers that accommodate low-speed CBR channels with more transmission opportunities in a case where a trunk band is vacant. In the first subschedule table SST1, transmission opportunities for CBR data are increased by proportional distribution relative to nrt-VBR media for which real-time transmission is not necessary. However, low-speed CBR transmission opportunities can be increased further to further shorten delay by searching only low-speed CBR at the highest priority without proportional distribution with respect to nrt-VBR media.

FIGS. 13A to 13D are diagrams useful in describing different schedule tables for low-speed CBR media in which a further reduction in delay of low-speed CBR is achieved in accordance with the present invention. The channel structure of the cell assembler/disassemblers CLADx, CLADy, CLADz, the various parameters SCR, PCR and the physical speed of the trunk line are the same as those in the case of FIGS. 12A to 12C.

In FIG. 13, MST, SST1 and SST2 represent a main schedule table, a first subschedule table and a second subschedule table, respectively, set up by the method described in the examples of schedule table settings in section (K). In FIG. 13B, CST represents a CBR-dedicated schedule table referred to after the main schedule table MST. Here cell assembler/disassemblers accommodating the CBR channel are equally distributed according to the percentages of the constant rates. Since the CBR channel is accommodated only in the cell assembler/disassembler CLADx, one CLADx is allocated in the CBR-dedicated schedule table CST.

If the processing of FIG. 5 for granting transmission privilege is executed in a state in which the schedule tables are set up as described above, the CBR-dedicated schedule table CST will be searched first (1) in a case where there is no cell is to be transmitted to a cell assembler/disassembler that has been allocated to a time slot of interest in the main schedule table MST, or (2) in a case where the cell transmission rate in this cell assembler/disassembler exceeds the peak cell rate, or (3) in a case where the time slot of interest is vacant. In cases (2), (3), therefore, transmission opportunities can be granted to the cell assembler/disassembler CLADz at 100% probability. In other words, if a low-speed CBR channel is requesting transmission, it can always be given permission to transmit at a priority higher than that of a VBR channel.

In a case where a low-speed CBR channel is not requesting transmission, the first subschedule table SST1 is searched and then the second subschedule table SST2.

Thus, in accordance with the present invention, one cell assembler is capable of accommodating multiple channels having different service categories, and this can be achieved through a simple arrangement.

Further, traffic management that takes service category and traffic into account is performed on a per-channel basis and, moreover, traffic management that takes service category and traffic into account is performed on a per-cell-assembler basis. As a result, even though one cell assembler accommodates multiple channels having different service categories, it is possible to perform the stringent traffic control that is required by ATM protocols.

Further, in accordance with the present invention, it is unnecessary for a cell assembler/disassembler to accommodate channels grouped by CLAD or by physical line. The same cell assembler/disassembler and the same physical line can accommodate channels of a plurality of service categories. As a result, multiplexing efficiency is raised greatly and it is possible to scale-down hardware, lower cost and reduce the number of terminal accommodation lines.

Further, in accordance with the present invention, waiting time on an ATM multiplexing bus is shortened for media, namely low-speed CBR media such as low-speed data and voice, that involves strict delay-time requirements and for which transmission in real-time must be guaranteed. This makes possible communication with little delay and also makes it possible to support networks having multiple repeaters.

Further, whereas the prior art requires that CBR media be allocated a band that exceeds the necessary band, the present invention is such that merely setting the necessary band assures little delay and makes it possible to raise band utilization efficiency.

As many apparently widely different embodiments of the present invention can be made without departing from the spirit and scope thereof, it is to be understood that the invention is not limited to the specific embodiments thereof except as defined in the appended claims.

What is claimed is:

1. A method of multiplexing ATM cells in an ATM cell multiplexing apparatus which includes: an ATM bus for transmitting ATM cells; a plurality of cell assemblers for assembling data that enters from terminal lines into ATM cells and sending the cells to the ATM bus; an ATM scheduler for granting transmission privileges to cell assemblers that have been allocated to time slots of N-number of cyclically repeating time slots, thereby allowing a cell assembler that has been granted the transmission privilege to send a cell to the ATM bus; and a trunk line controller for time-division multiplexing ATM cells sent to the ATM bus and transmitting these ATM cells to a network via a trunk line, said method comprising the following steps in each cell assembler:

performing traffic management, based upon service category and traffic, for every channel accommodated; and assembling data, which enters from a terminal line, into ATM cells and sending the ATM cells to said ATM bus when the privilege is granted to said cell assembler; and the following steps in said ATM bus scheduler:

providing a schedule table for deciding to which cell assemblers the transmission privileges in each of the time slots are to be granted taking into consideration the service categories and traffic of all channels accommodated by the cell assemblers; and performing traffic management, on a per-cell assembler basis, based upon a schedule of said schedule table and overall traffic of the cell assembler and granting transmission privilege to each cell assembler in accordance with said schedule of said schedule table.

2. The method according to claim 1, wherein traffic management performed for every channel in said cell assemblers includes a step of:

discarding data when the rate at which the data on a channel flows in from a terminal line exceeds a peak rate that has been stipulated for this channel.

3. The method according to claim 1, wherein traffic management performed for every channel in said cell assemblers includes steps of:

assigning priorities to service categories;

assembling data into cells in order of priority conforming to the service category of each channel; and sending these cells to the ATM bus whenever the transmission privilege is granted.

4. The method according to claim 1, wherein traffic management performed on a per-cell-assembler basis in said ATM bus scheduler includes steps of:

deciding a schedule for granting a transmission privilege to a cell assembler taking into consideration the service categories and traffic of all channels accommodated by this cell assembler; and granting transmission privileges to each of the cell assemblers based upon the schedule.

5. The method according to claim 4, wherein traffic management performed on a per-cell-assembler basis in said ATM bus scheduler includes steps of:

monitoring cell transmission rate on a per-cell-assembler basis; and when the cell transmission rate of a cell assembler exceeds a total value of peak cell rates of each of the channels of this cell assembler, granting no transmission privilege to this cell assembler.

6. The method according to claim 5, wherein the service categories of the channels accommodated by a cell assembler are CBR, rt-VBR, nrt-VBR and UBR, and further comprising the steps of:

creating a main schedule table, which is for granting transmission privileges to said cell assemblers, based upon a cell rate obtained by totaling sustained cell rates of each of the channels on a per-cell-assembler basis;

creating a first subschedule table, which is for granting transmission privileges to said cell assemblers, based upon a cell rate obtained by totaling peak cell rates of nrt-VBR channels on a per-cell-assembler basis;

creating a second subschedule table which, based upon whether a UBR channel is accommodated on a per-cell-assembler basis, grants the transmission privileges to cell assemblers that accommodate the UBR channel;

granting the transmission privilege to a prescribed cell assembler in a certain time slot upon referring to said main schedule table;

granting the transmission privilege to a prescribed cell assembler upon referring to said first subschedule table in a case where there is no cell to be transmitted in the granted cell assembler, or in a case where the cell transmission rate in this granted cell assembler is greater than the total peak cell rate, or in a case where the transmission privilege has not been granted to any cell assembler in said time slot; and granting the transmission privilege to a prescribed cell assembler upon referring to said second subschedule table in a case where a cell assembler that is to transmit a cell has not been decided based upon said first subschedule table.

7. A method of multiplexing ATM cells in an ATM cell multiplexing apparatus which includes: an ATM bus for transmitting ATM cells; a plurality of cell assemblers for assembling data that enters from terminal lines into ATM cells and sending the cells to the ATM bus; an ATM scheduler for granting transmission privileges to cell assemblers that have been allocated to time slots of N-number of cyclically repeating time slots, thereby allowing a cell assembler that has been granted the transmission privilege to send a cell to the ATM bus; and a trunk line controller for time-division multiplexing ATM cells sent to the ATM bus and transmitting these ATM cells to a network via a trunk line, said method comprising the steps of:

creating a main schedule table, which is for deciding to which cell assembler the transmission privilege is to be granted in each of the N-number of time slots, based upon service categories and traffic of all channels accommodated by the cell assemblers, as well as a subschedule table, which is referred to after said main schedule table, for allocating more transmission privileges to a cell assembler that accommodates a constant-rate service-category channel; and granting transmission privileges to cell assemblers upon referring to said main schedule table and said subschedule table.

8. The method according to claim 7, further comprising the steps of:

monitoring cell transmission rate on a per-cell-assembler basis; and when the cell transmission rate of a cell assembler exceeds a total value of peak cell rates of each of the channels of this cell assembler, granting no transmission privilege to this cell assembler.

9. The method according to claim 7, further comprising the steps of:

creating the main schedule table, based upon a cell rate obtained by totaling sustained cell rates of each of the channels accommodated by the cell assemblers, in such a manner that transmission privileges in the N-number of time slots will be granted to each of the cell assemblers; and granting the transmission privilege to a cell assembler upon referring to said subschedule table in a case where a cell to be transmitted in the cell assembler to which the transmission privilege has been granted upon referring to said main schedule table does not exist in a certain time slot, or in a case where the cell transmission rate in this granted cell assembler is greater than the peak cell rate, or in a case where the transmission privilege has not been granted to a cell assembler in said time slot.

10. The method according to claim 7, further comprising the steps of:

creating the main schedule table, based upon a cell rate obtained by totaling sustained cell rates of each of the channels accommodated by cell assemblers, in such a manner that the transmission privileges will be granted to these cell assemblers;

creating a first subschedule table, based upon whether cell assemblers accommodate a channel of a constant-rate service category, for granting the transmission privileges to these cell assemblers;

creating a second subschedule table, based upon a cell rate obtained by totaling peak cell rates of nrt-VBR channels accommodated by cell assemblers, for granting the transmission privileges to these cell assemblers;

creating a third subschedule table, based upon whether cell assemblers accommodate a UBR channel, for granting transmission privileges to these cell assemblers; and granting the transmission privilege to a prescribed cell assembler upon referring to the tables in the following order of priority: main schedule table→first subschedule table→second subschedule table→third subschedule table.

11. An ATM cell multiplexing apparatus for assembling data from terminal lines into cells, multiplexing the cells and sending the cells to an ATM network, comprising:

an ATM bus for transmitting ATM cells;

a plurality of cell assemblers for assembling data that enters from the terminal lines into ATM cells and sending the ATM cells to the ATM bus;

an ATM scheduler for granting transmission privileges to cell assemblers that have been allocated to time slots of N-number of cyclically repeating time slots, thereby allowing a cell assembler that has been granted the transmission privilege to send a cell to the ATM bus; and a trunk line controller for time-division multiplexing ATM cells sent to the ATM bus and transmitting these ATM cells to a network via a trunk line;

each of said cell assemblers including:

traffic management means for performing traffic management, based upon service category and traffic, for every channel accommodated; and cell assembling means responsive to a command from said traffic management means for assembling data, which enters from a terminal line, into ATM cells and sending the ATM cells to said ATM bus; and said ATM scheduler including:

a schedule table for deciding to which cell assemblers the transmission privileges in each of the time slots are to be granted taking into consideration the service categories and traffic of all channels accommodated by the cell assemblers; and traffic management means for performing traffic management, on a per-cell-assembler basis, based upon a schedule of said schedule table and overall traffic of the cell assembler.

12. The apparatus according to claim 11, wherein the traffic management means of said cell assemblers has discarding means for discarding data when the rate at which the data on a channel flows in from a terminal line exceeds a peak rate that has been stipulated for this channel.

13. The apparatus according to claim 11, wherein said cell assembling means assembles data into cells in an order of priority conforming to the service category of each channel.

14. An ATM cell multiplexing apparatus for assembling data from terminal lines into cells, multiplexing the cells and sending the cells to an ATM network, comprising:

an ATM bus for transmitting ATM cells;

a plurality of cell assemblers for assembling data that enters from the terminal lines into ATM cells and sending the ATM cells to the ATM bus;

an ATM scheduler for granting transmission privileges to cell assemblers that have been allocated to time slots of N-number of cyclically repeating time slots, thereby allowing a cell assembler that has been granted the transmission privilege to send a cell to the ATM bus; and a trunk line controller for time-division multiplexing ATM cells sent to the ATM bus and transmitting these ATM cells to a network via a trunk line;

said ATM scheduler including:

a main schedule table for deciding to which cell assembler the transmission privilege in each of the N-number of time slots is to be granted based upon service categories and traffic of all channels accommodated by the cell assemblers;

a subschedule table, which is referred to after said main schedule table, for allocating more transmission privileges to a cell assembler that accommodates a constant-rate service-category channel; and a transmission-privilege granting controller for granting transmission privileges to cell assemblers upon referring to said main schedule table and said subschedule table.

* * * * *